(12) United States Patent
Ikawa et al.

(10) Patent No.: US 11,353,883 B2
(45) Date of Patent: Jun. 7, 2022

(54) CARRIER, CARRIER WITH RECEPTION CAPABILITY, CARRIER SYSTEM, HOST SYSTEM, METHOD FOR CONTROLLING THE CARRIER, AND NON-TRANSITORY STORAGE MEDIUM

(71) Applicant: Panasonic Intellectual Property Management Co., Ltd., Osaka (JP)

(72) Inventors: Yoshihiro Ikawa, Osaka (JP); Hiroshi Shirouzu, Shiga (JP); Osamu Mizuno, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 227 days.

(21) Appl. No.: 16/243,376

(22) Filed: Jan. 9, 2019

(65) Prior Publication Data
US 2019/0243374 A1   Aug. 8, 2019

(30) Foreign Application Priority Data

Feb. 2, 2018  (JP) .............................. JP2018-017488

(51) Int. Cl.
| | | |
|---|---|---|
| G05D 1/02 | (2020.01) | |
| G06V 20/56 | (2022.01) | |
| G05D 1/00 | (2006.01) | |
| G06T 7/00 | (2017.01) | |
| H04N 5/247 | (2006.01) | |

(52) U.S. Cl.
CPC ......... *G05D 1/0231* (2013.01); *G05D 1/0088* (2013.01); *G06V 20/56* (2022.01); *G05D 2201/0216* (2013.01); *G06T 7/0002* (2013.01); *G06T 2207/10024* (2013.01);
(Continued)

(58) Field of Classification Search
CPC ............... G05D 1/0231; G05D 1/0088; G05D 2201/0216; G06K 9/00791; G06T 7/0002; G06T 2207/10024; G06T 2207/10028; G06T 2207/10048; G06T 2207/30261; H04N 5/247; B66F 9/063
See application file for complete search history.

(56) References Cited

U.S. PATENT DOCUMENTS 9,561,941 B1 *  2/2017  Watts ................... G05D 1/0297
9,824,453 B1 * 11/2017  Collins ................. G06Q 40/08
(Continued)

FOREIGN PATENT DOCUMENTS

| JP | H07-168623 A | 7/1995 |
|---|---|---|
| JP | 07-225614 A | 8/1995 |

(Continued)

OTHER PUBLICATIONS

Japanese Office Action issued in Japanese Patent Application No. JP2018-017488 dated Nov. 30, 2021.

*Primary Examiner* — James M Mcpherson
*Assistant Examiner* — Kyle J Kingsland
(74) *Attorney, Agent, or Firm* — Pearne & Gordon LLP

(57) ABSTRACT

A carrier includes a body, a sensor, and an output unit. The body has the ability to travel autonomously and includes a holding mechanism for holding a burden. The sensor is provided for the body and detects a situation surrounding the body. The output unit outputs detected information, collected by the sensor, about the situation to a management device that manages operation of another carrier.

25 Claims, 11 Drawing Sheets

(52) U.S. Cl.
CPC .............. *G06T 2207/10028* (2013.01); *G06T 2207/10048* (2013.01); *G06T 2207/30261* (2013.01); *H04N 5/247* (2013.01)

(56) References Cited

U.S. PATENT DOCUMENTS

| | | | |
|---|---|---|---|
| 10,209,711 B1* | 2/2019 | Brazeau | G06N 20/00 |
| 10,310,499 B1* | 6/2019 | Brady | G06Q 10/087 |
| 10,409,281 B1* | 9/2019 | Garrett | G05D 1/0297 |
| 10,755,227 B1* | 8/2020 | Aggarwal | G05D 1/0274 |
| 2016/0176638 A1* | 6/2016 | Toebes | B65G 1/0492 |
| | | | 700/216 |
| 2016/0210853 A1* | 7/2016 | Koravadi | G08G 1/096775 |
| 2018/0236828 A1* | 8/2018 | Dudar | G05D 1/0291 |
| 2019/0176328 A1* | 6/2019 | Kichkaylo | B66F 9/063 |
| 2019/0187699 A1* | 6/2019 | Salour | G05D 1/0246 |
| 2019/0227571 A1* | 7/2019 | Ito | G05D 1/02 |

FOREIGN PATENT DOCUMENTS

| | | |
|---|---|---|
| JP | 3500051 B2 | 2/2004 |
| JP | 3596434 B2 | 12/2004 |
| JP | 2012-053838 A | 3/2012 |
| JP | 2016-052919 A | 4/2016 |

\* cited by examiner

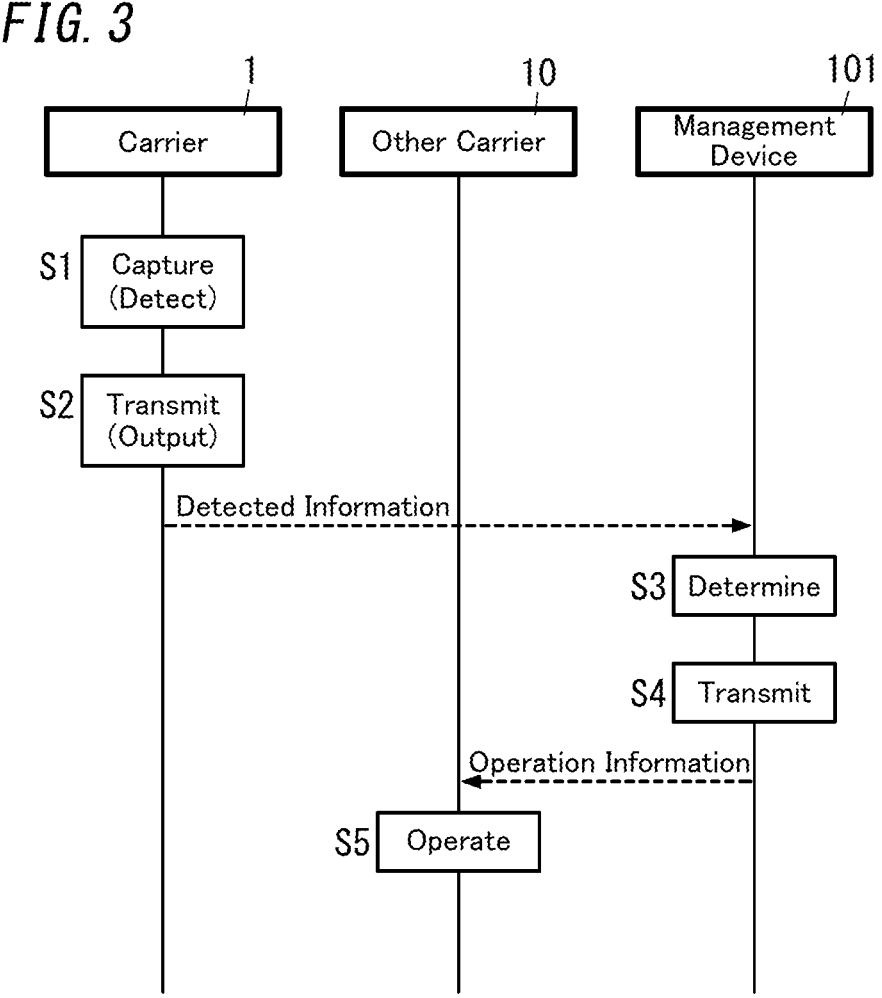

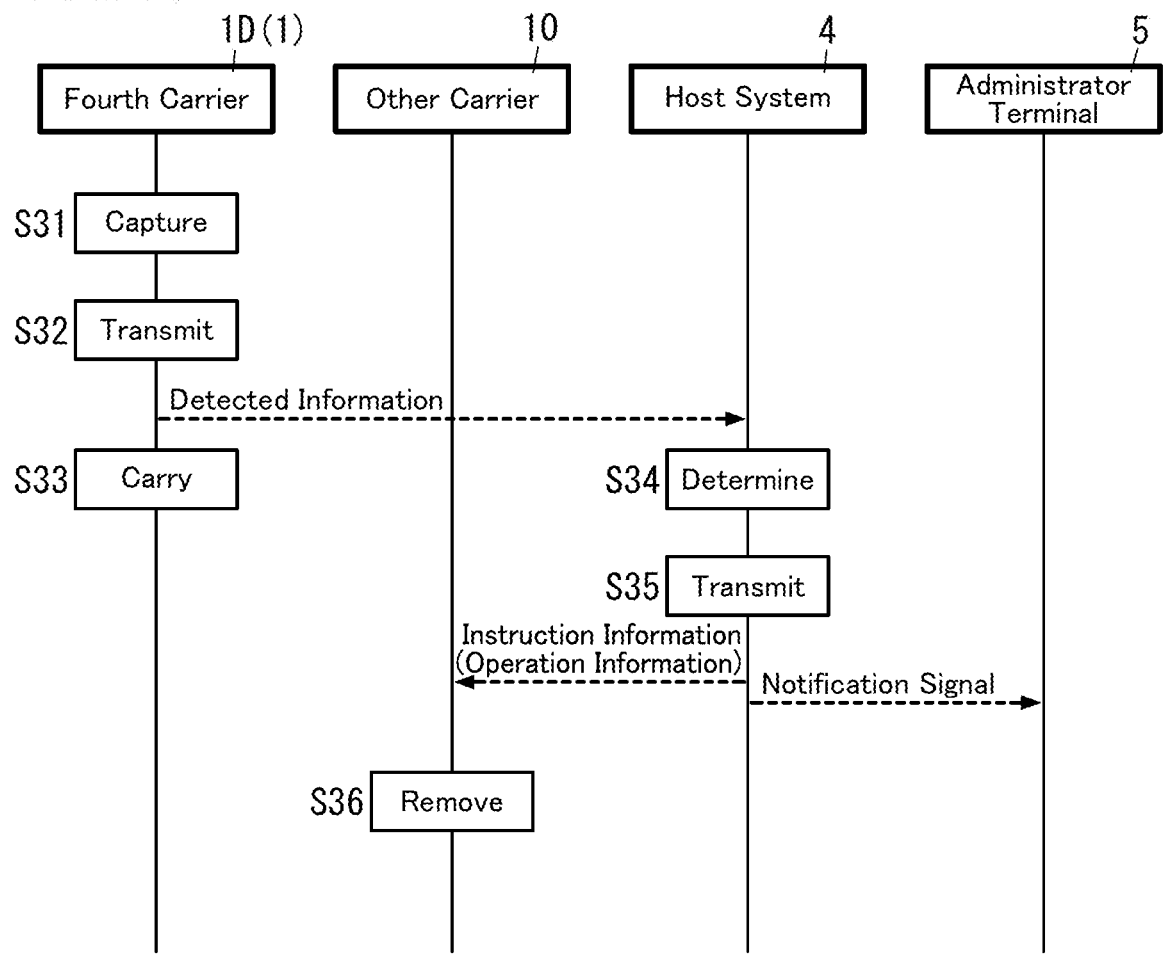

CARRIER, CARRIER WITH RECEPTION CAPABILITY, CARRIER SYSTEM, HOST SYSTEM, METHOD FOR CONTROLLING THE CARRIER, AND NON-TRANSITORY STORAGE MEDIUM

CROSS-REFERENCE TO RELATED APPLICATION

This application claims the benefit of foreign priority to Japanese Patent Application No. 2018-017488 filed on Feb. 2, 2018, which is assigned to the assignee of the present application and the entire contents of which are hereby incorporated by reference for all purposes.

TECHNICAL FIELD

The present disclosure generally relates to a carrier, a carrier with reception capability, a carrier system, a host system, a method for controlling the carrier, and a non-transitory storage medium. More particularly, the present disclosure relates to a carrier configured to move around in an object space, a carrier with reception capability, a carrier system, a host system, a method for controlling the carrier, and a non-transitory storage medium.

BACKGROUND ART

JP 2012-53838 A (hereinafter referred to as "D1") discloses an unmanned carrier vehicle (carrier) designed to move within a traveling area in accordance with route data. The unmanned carrier vehicle is configured to move with a burden loaded and to unload the burden. Also, this unmanned carrier vehicle has the capability of traveling, when detecting any obstacle ahead of itself while traveling, so as to circumvent the obstacle.

In the unmanned carrier vehicle of D1, however, the result of detection of an obstacle, or information collected by the unmanned carrier vehicle, is certainly usable to allow that unmanned carrier vehicle that has acquired that information to travel safely, but is not available to any other unmanned carrier vehicle, which is a problem with the known unmanned carrier vehicle.

SUMMARY

The present disclosure provides a carrier configured to make information detected by itself available to other carriers, a carrier with reception capability, a carrier system, a host system, a method for controlling the carrier, and a non-transitory storage medium.

A carrier according to an aspect of the present disclosure includes a body, a sensor, and an output unit. The body has the ability to travel autonomously and includes a holding mechanism for holding a burden. The sensor is provided for the body and detects a situation surrounding the body. The output unit outputs detected information, collected by the sensor, about the situation to a management device that manages operation of another carrier.

A carrier with reception capability according to another aspect of the present disclosure includes a body and a reception unit. The body has the ability to travel autonomously and includes a holding mechanism for holding a burden. The reception unit receives, from the management device, the operation information based on the detected information output by the carrier. The carrier with reception capability operates in accordance with the operation information received by the reception unit.

A carrier system according to still another aspect of the present disclosure includes a plurality of carriers. The plurality of carriers includes the carrier and a carrier with reception capability. The carrier with reception capability includes a body and a reception unit. The body has the ability to travel autonomously and includes a holding mechanism configured to hold a burden. The reception unit receives, from the management device, operation information based on the detected information output by the carrier. The carrier with reception capability operates in accordance with the operation information received by the reception unit.

A host system according to yet another aspect of the present disclosure functions as the management device for use in the carrier system, and manages respective operations of the plurality of carriers.

A method for controlling a carrier according to yet another aspect of the present disclosure is a method for controlling a carrier including a body and a sensor. The body has the ability to travel autonomously and includes a holding mechanism for holding a burden. The sensor is provided for the body and detects a situation surrounding the body. The method for controlling a carrier includes outputting detected information, collected by the sensor, about the situation to a management device for managing operation of another carrier.

A non-transitory storage medium according to yet another aspect of the present disclosure has stored thereon a program for controlling a carrier including a body and a sensor. The body has the ability to travel autonomously and includes a holding mechanism for holding a burden. The sensor is provided for the body and detects a situation surrounding the body. The program is designed to make a computer system execute output processing of outputting detected information, collected by the sensor, about the situation to a management device that manages operation of another carrier.

BRIEF DESCRIPTION OF DRAWINGS

FIG. 3 is a timing chart illustrating how the carrier system operates;

FIG. 11 is a timing chart illustrating how the carrier system performs the third exemplary operation.

DESCRIPTION OF EMBODIMENTS (1) Overview

Figure 2:
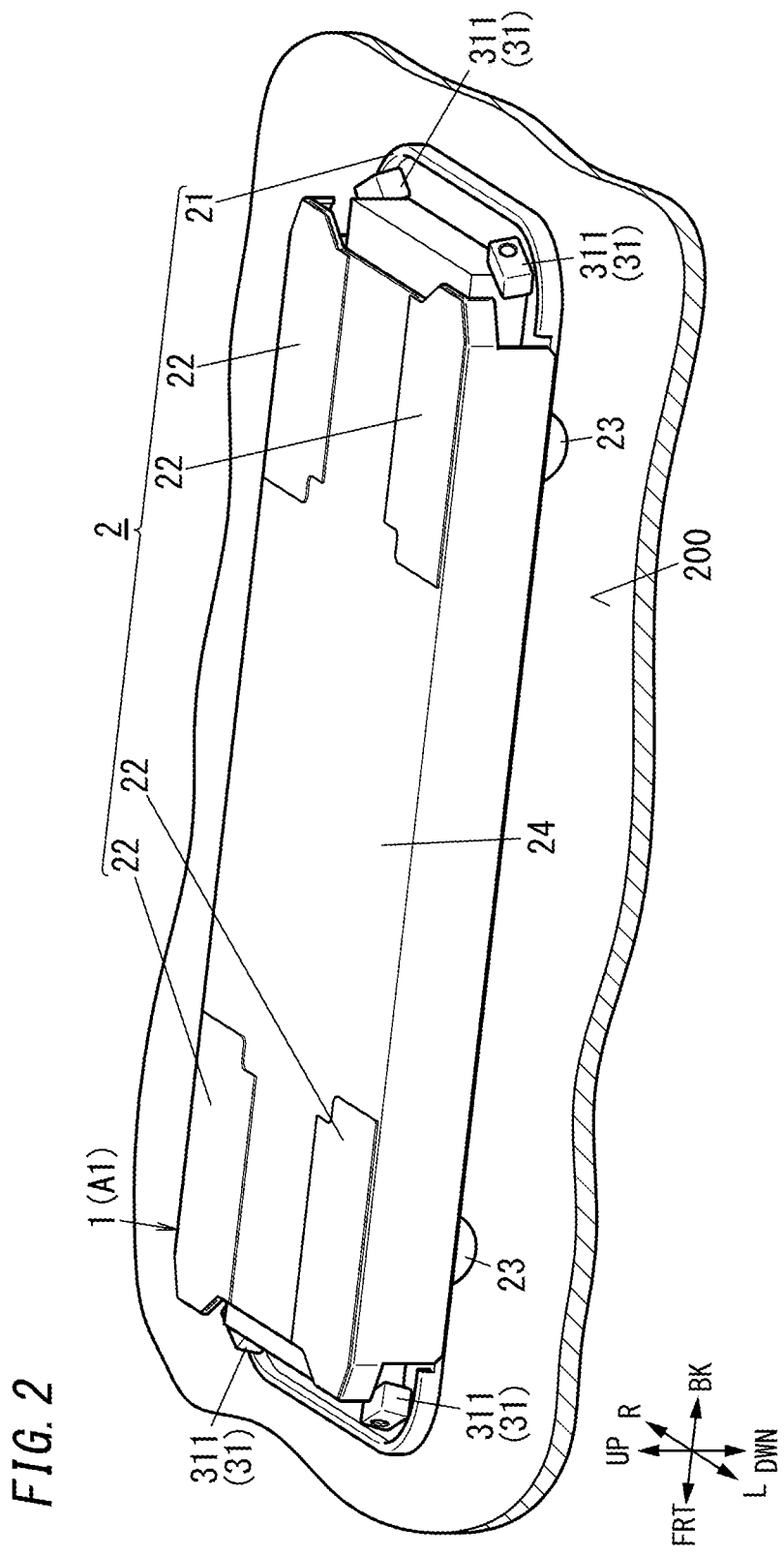
FIG. 2 is a perspective view illustrating the appearance of the carrier.
Figure 5A:
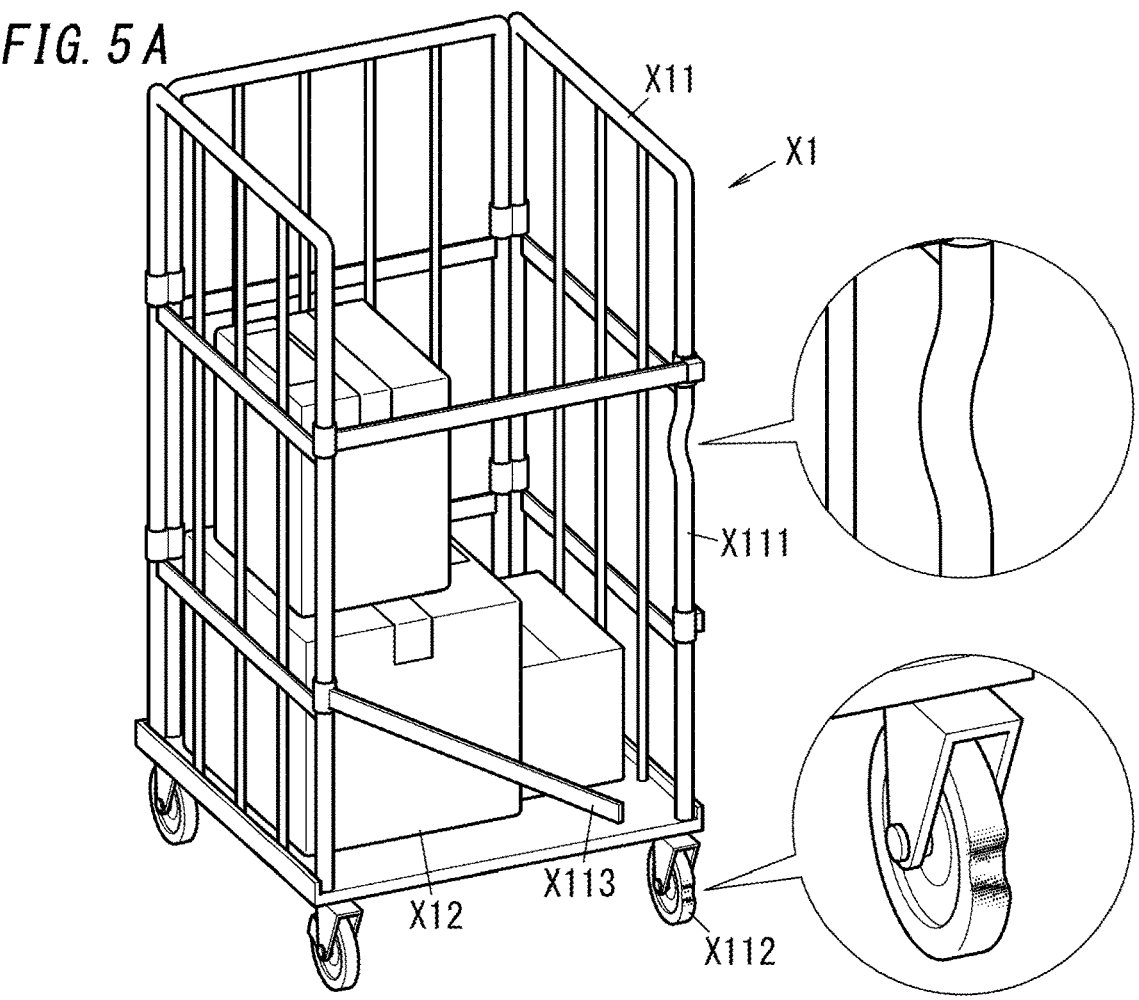
FIG. 5A schematically illustrates an abnormal condition of a roll box pallet carried by the carrier.
Figure 5B:
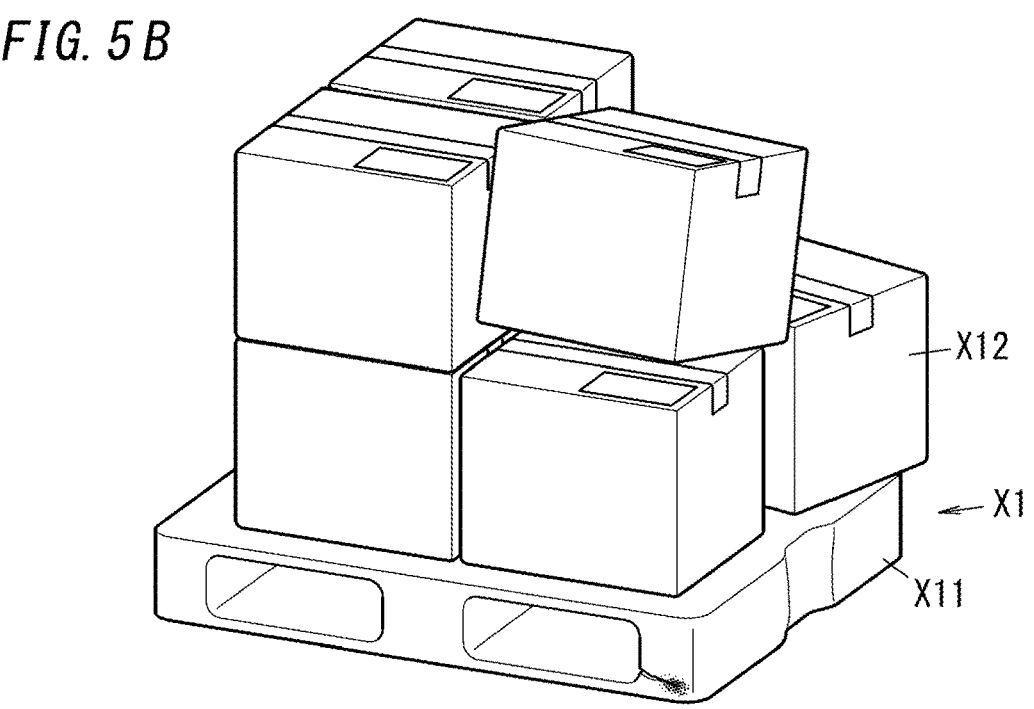
FIG. 5B schematically illustrates an abnormal condition of a flat pallet carried by the carrier.

A carrier 1 according to an exemplary embodiment is a vehicle designed to travel on a traveling surface 200 on a plurality of wheels 23 as shown in FIG. 2 and to carry a burden X1 (see FIGS. 5A and 5B). The carrier 1 may be introduced into distribution centers (including parcel shipping centers), factories, offices, stores, schools, hospitals, and various other facilities. As used herein, the "traveling surface 200" is a surface on which the carrier 1 is designed to move. If the carrier 1 moves inside of a facility, the traveling surface 200 may be the floor surface of the facility, for example. On the other hand, if the carrier 1 moves outdoors, then the traveling surface 200 may be the ground, for example. In the following description of embodiments, the carrier 1 is introduced into a distribution center.

Figure 1:
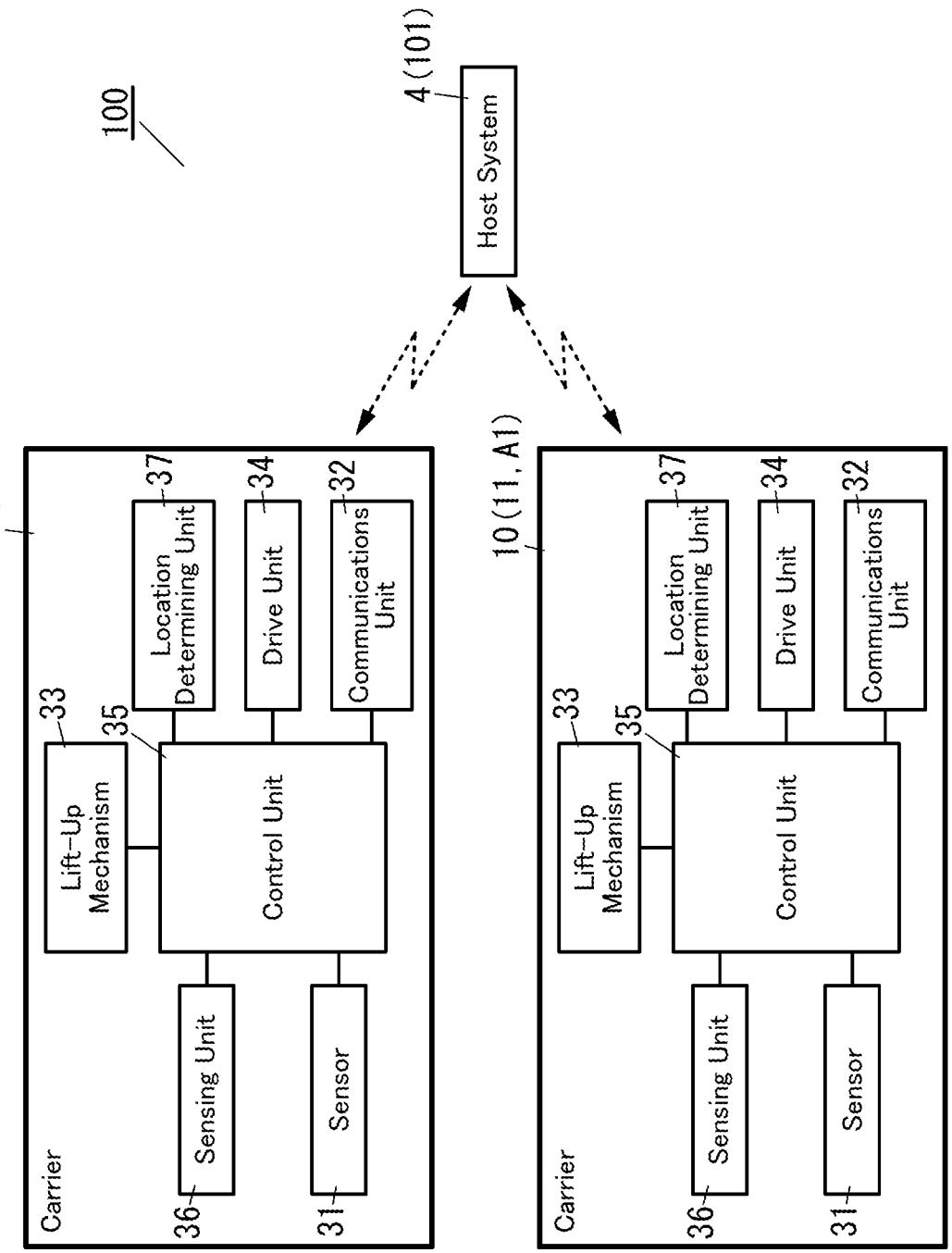
FIG. 1 is a block diagram of a carrier system including a carrier according to an exemplary embodiment of the present disclosure.

The carrier 1 includes a body 2, a sensor 31, and a communications unit (output unit) 32 as shown in FIGS. 1 and 2.

The body 2 is able to travel autonomously, and includes a holding mechanism (lift-up mechanism) 33 for holding the burden X1. That is to say, the carrier 1 is able to travel autonomously with the burden X1 held by the holding mechanism 33.

The sensor 31 is provided for the body 2 to detect a situation surrounding the body 2 (hereinafter also referred to as "surroundings of the body 2"). As used herein, the "surroundings of the body 2" correspond to a detectible range for the sensor 31. That is to say, the range indicated by the "surroundings of the body 2" depends on the performance of the sensor 31. In other words, the "surroundings of the body 2" sometimes refers to the entire 360 degree range surrounding the body 2 in all directions and sometimes refers to only an area that defines a predetermined angle with respect to the body 2 as a vertex.

The communications unit (output unit) 32 outputs the detected information, collected by the sensor 31, about the situation to a management device 101 that manages the operation of another carrier 10. In this embodiment, the communications unit 32 outputs the detected information to a host system 4 (to be described later) serving as the management device 101. In addition, in this embodiment, the management device 101 also outputs operation information, based on the detected information acquired from the carrier 1, to another carrier 10. That is to say, the detected information is used not only directly by the carrier 1 itself that has acquired the detected information but also indirectly by another carrier 10, other than the carrier 1 that has acquired the detected information.

As can be seen, according to this embodiment, the detected information acquired by the carrier 1 is output to the management device 101 that manages the operation of the other carrier 10. Then, the management device 101 managing the operation of the other carrier 10 based on the detected information acquired allows the other carrier 10 to use the detected information indirectly. That is to say, according to this embodiment, the information detected (i.e., detected information) is available to the other carrier 10, which is one of advantages achieved by this embodiment.

(2) Details

A carrier 1, carrier 11 with reception capability, carrier system 100, and host system 4 according to this embodiment will be described in detail with reference to FIGS. 1 and 2. In the following description, unless otherwise stated, the direction perpendicular to the traveling surface 200 (i.e., the vertical direction) will be hereinafter referred to as an "upward/downward direction" and the carrier 1 is supposed to be located "over" the traveling surface 200. Stated otherwise, the traveling surface 200 is supposed to be located "under" the carrier 1. Also, while the carrier 1 is traveling forth, the direction in which the carrier 1 goes will be hereinafter referred to as a "forward direction" and the opposite direction will be hereinafter referred to as a "backward direction." Furthermore, the direction that is perpendicular to both the upward/downward direction and the forward/backward direction will be hereinafter referred to as a "rightward/leftward direction." However, these directions are only an example and should not be construed as limiting the directions in which the carrier 1 is used. It should also be noted that the arrows indicating the respective directions on the drawings are shown there only for the purpose of description and insubstantial ones.

The carrier system 100 includes a plurality of carriers A1. The plurality of carriers A1 includes the carrier 1 and a carrier 11 with reception capability. As used herein, the "carrier with reception capability" refers to a device including the body 2, receiving operation information based on the detected information output by the carrier 1, and operating in accordance with the operation information received. In other words, the "carrier with reception capability" is a carrier A1 with the ability to receive the operation information. In this embodiment, each of the plurality of carriers A1 is the carrier 1 and the carrier 11 with reception capability as well. In the following description, when attention is paid to any one of the carriers A1, that carrier A1 will be hereinafter referred to as "one carrier 1" and another one of the other carriers A1 will be hereinafter referred to as "another carrier 10," unless otherwise stated. Also note that "another carrier 10" will be hereinafter referred to as "the other carrier 10" when mentioned for the second time and on. That is to say, even when an embodiment is described about only "one carrier" and "the other carrier," the description does not preclude the possibility of presence of other carriers within the same detection range.

The carrier 1 includes the body 2, the sensor 31, and the communications unit (output unit and a reception unit) 32, as described above. In this embodiment, the carrier 1 further includes a lift-up mechanism 33, a drive unit 34, a control unit 35, a sensing unit 36, and a location determining unit 37. In this embodiment, the lift-up mechanism 33, the drive unit 34, the control unit 35, the sensing unit 36, and the location determining unit 37 are all built in the body 2.

The carrier 1 may travel autonomously on a flat traveling surface 200 such as the floor surface of a facility. In this embodiment, the carrier 1 is supposed to be provided with a storage battery and be powered by electric energy stored in the storage battery. In this embodiment, the carrier 1 travels on the traveling surface 200 with the body 2 loaded with the burden X1. This allows the carrier 1 to carry the burden X1 placed at a certain location inside the facility to somewhere else inside the facility.

In this embodiment, the burden X1 may be either a pallet X11 or a pallet X11 with a pile of packages X12 (see FIGS. 5A and 5B). The pallet X11 may be either a roll box pallet (including a cold roll box pallet) or a flat pallet. In the following description, unless otherwise stated, the pallet X11 is supposed to be a roll box pallet.

The body 2 is configured in the shape of a rectangular parallelepiped, of which the dimension measured in the forward/backward direction (i.e., its length) is greater than its dimension measured in the rightward/leftward direction (i.e., its width) and of which the dimension measured in the upward/downward direction (i.e., its height) is smaller than its length and its width. As will be described in detail later, in this embodiment, the burden X1 is placed on the body 2 so as to be lifted by the body 2 that has slipped into the gap under the burden X1. Thus, the dimension of the body 2 measured in the upward/downward direction is set at a value sufficiently smaller than its dimension measured in the rightward/leftward direction such that the body 2 may slip into the gap under the burden X1.

The body 2 includes a vehicle body 21 and an elevator plate 22. In this embodiment, the body 2 is made of a metallic material. However, this is only an example and should not be construed as limiting. Alternatively, the body 2 may also be made of a resin, for example.

The vehicle body 21 is supported on the traveling surface 200 by a plurality of (e.g., four) wheels 23. The plurality of wheels 23 are arranged at four corners of the vehicle body 21 in a plan view. The respective wheels 23 are configured to turn independently of each other under the driving force applied by the drive unit 34. These wheels 23 are held by the body 2 (more exactly, by the vehicle body 21) so as to turn around axles extending in the rightward/leftward direction.

In this embodiment, all of these wheels 23 are "drive wheels" to be driven by the drive unit 34. Driving all of these wheels 23 on an individual basis allows the body 2 to move in every direction. That is to say, the body 2 supported by the respective wheels 23 is allowed to move on the traveling surface 200 in all directions, including forward, backward, leftward, and rightward directions, by turning the plurality of wheels 23. Each of these wheels 23 may be an omnidirectional moving wheel such as an omni-wheel.

The elevator plate 22 is arranged over the vehicle body 21 so as to cover the upper surface of the vehicle body 21 at least partially. In this embodiment, the elevator plate 22 covers the four corners of the upper surface of the vehicle body 21. The upper surface of the elevator plate 22 defines a load platform 24 to be loaded with the burden X1 when the burden X1 is carried by the carrier 1. In this embodiment, four corner portions of the load platform 24 are slightly raised with respect to the rest (such as a middle portion) of the load platform 24. Furthermore, the four corner portions of the load platform 24 are given a greater coefficient of friction than the rest of the load platform 24 by being subjected to anti-slip treatment. This reduces the chances of the burden X1 placed on the load platform 24 slipping on the load platform 24.

In this embodiment, the elevator plate 22 is configured to be elevated and lowered by the lift-up mechanism 33 with respect to the vehicle body 21. Thus, elevating the elevator plate 22 with the body 2 slipped into the gap under the burden X1 allows the burden X1 to be lifted by the elevator plate 22. Conversely, lowering the elevator plate 22 with the burden X1 lifted by the elevator plate 22 allows the burden X1 to be unloaded from the elevator plate 22.

The sensor 31 includes an RGB camera and an infrared camera. The RGB camera obtains an RGB image by capturing an image of surroundings of the body 2. In this embodiment, the RGB camera captures a series of images while the carrier 1 is traveling, thus acquiring depth information based on the series of images captured. That is to say, in this embodiment, the RGB camera obtains an RGB-D image by capturing images of surroundings of the body 2. On the other hand, the infrared camera obtains a thermal image by capturing an image of surroundings of the body 2. The RGB-D image and thermal image obtained by the sensor 31 are output as pieces of detected information to the management device 101 (e.g., the host system 4 in this embodiment) via the communications unit 32. In this embodiment, the sensor 31 is kept ON while the carrier 1 is traveling, thus acquiring the detected information at regular intervals.

The object to be detected by the sensor 31 varies according to the situation surrounding the carrier 1. For example, if there is any other carrier 10 around the carrier 1, the object to be detected by the sensor 31 is a condition of the other carrier 10. In other words, the situation detected by the sensor 31 may include the condition of the other carrier 10. In that case, the condition, detected by the sensor 31, of the other carrier 10 includes whether or not any error has occurred in the other carrier 10 (e.g., whether the parts that form the other carrier 10 are in a normal condition or operating normally). Also, if the other carrier 10 is carrying a burden X1, the condition, detected by the sensor 31, of the other carrier 10 includes a condition of the burden X1 carried by the other carrier 10. Furthermore, the object to be detected by the sensor 31 also includes conditions of the traveling route of the carrier 1 traveling and conditions of the traveling route that the other carrier 10 is traveling along, or is going to travel along. That is to say, the object to be detected by the sensor 31 may sometimes be the conditions of the traveling route of at least one of the carrier 1 or the other carrier 10. In other words, the situation detected by the sensor 31 may include the conditions of the traveling route of the carrier 1 and/or the other carrier 10.

In this embodiment, the carrier 1 includes four sensor blocks 311 (see FIG. 2), each of which includes the RGB camera and the infrared camera. Two of the four sensor blocks 311 are provided at the front end of the body 2, and the other two sensor blocks 311 are provided at the rear end of the body 2. The two sensor blocks 311 provided at the front end of the body 2 are designed to capture an image of a semicircular area centered around the front end of the body 2 in a plane parallel to the traveling surface 200. Meanwhile, the two sensor blocks 311 provided at the rear end of the body 2 are designed to capture an image of a semicircular area centered around the rear end of the body 2 in the plane parallel to the traveling surface 200.

The communications unit 32 includes, for example, a communications module designed to establish wireless communication by a communication method such as Wi-Fi®. Alternatively, the communications unit 32 may include a communications module designed to establish wireless communication by a communication method that requires no wireless station license. Examples of this type of communication methods include ones compliant with Bluetooth®, ZigBee®, and Specified Low Power Radio standards. In this embodiment, the communications unit 32 has a communication capability to communicate with the host system 4. Then, the communications unit 32 transmits the detected information, collected by the sensor 31, to the host system 4 serving as the management device 101. That is to say, the communications unit 32 corresponds to an output unit that outputs the detected information, collected by the sensor 31, to the management device 101. The communications unit 32 also receives operation information (to be described later) output by the host system 4. That is to say, the communications unit 32 also corresponds to a reception unit that receives the operation information from the management device 101.

The lift-up mechanism 33 is a mechanism for lifting the burden X1 by elevating the load platform 24. In other words, the lift-up mechanism 33 serves as a holding mechanism for holding the burden X1 by lifting the burden X1. In this embodiment, the load platform 24 is the upper surface of the elevator plate 22. Thus, the lift-up mechanism 33 elevates or lowers the load platform 24 by moving the elevator plate 22 up and down with respect to the vehicle body 21. The lift-up mechanism 33 moves the elevator plate 22 between a lower-limit position and an upper-limit position of the movable range of the elevator plate 22. The lift-up mechanism 33 is built in the body 2 so as to be located between the vehicle body 21 and the elevator plate 22.

This allows the carrier 1 to slip the body 2 into the gap under the burden X1 when the elevator plate 22 is located at the lower-limit position of the movable range. Then, having the elevator plate 22 elevated by the lift-up mechanism 33 to the upper-limit position of the movable range with the body 2 slipped into the gap under the burden X1 allows the burden X1 to be lifted by the elevator plate 22. The movable range of the elevator plate 22 may have either a constant value (fixed value) or a variable value. The lift-up mechanism 33 may include an electric motor, for example, and may be implemented as any appropriate mechanism, such as a pantograph or rack-pinion mechanism, configured to allow the elevator plate 22 to move straight up and down under the driving force generated by the electric motor.

The drive unit 34 applies driving force either directly or indirectly to a drive wheel that is at least one of the plurality of wheels 23. In this embodiment, the plurality of wheels 23 are all drive wheels as described above, and therefore, the drive unit 34 applies driving force to all of those wheels 23. The drive unit 34 is built in the vehicle body 21. The drive unit 34 includes an electric motor, for example, and applies the driving force generated by the electric motor to the wheels 23 indirectly via a gearbox, a belt, and other members. Alternatively, the drive unit 34 may also be configured to apply the driving force directly to the respective wheels 23 as in an in-wheel motor. The drive unit 34 drives, in response to a control signal from the control unit 35, the respective wheels 23 in rotational directions and rotational velocities specified by the control signal.

The control unit 35 controls the sensor 31, the communications unit 32, the lift-up mechanism 33, the drive unit 34, and the sensing unit 36. In this embodiment, the control unit 35 is implemented as a computer system including, as its major components, a processor and a memory. In other words, a computer system, including a processor and a memory, performs the function of the control unit 35 by making the processor execute a program stored in the memory. The program may be stored in advance in the memory or may also be downloaded via a telecommunications line such as the Internet or distributed after having been stored on a non-transitory storage medium such as a memory card.

The sensing unit 36 detects the behavior of the body 2, and a situation surrounding the body 2, or collects any other type of data. As used herein, the "behavior" of some member refers to the operation, appearance, and other information about the member. That is to say, the behavior of the body 2 includes the operating state of the body 2 indicating that the body 2 is traveling or at a stop, the velocity of the body 2 (and a variation in its velocity), acceleration applied to the body 2, and the orientation of the body 2. Specifically, the sensing unit 36 may include a velocity sensor, an acceleration sensor, a gyro sensor, and other types of sensors, for example, and detects the behavior of the body 2 using these sensors. The sensing unit 36 may include a sonar sensor, a radar, a light detection and ranging (LiDAR) sensor, and other types of sensors, and detects a situation surrounding the body 2 with these sensors.

The location determining unit 37 determines the location of the body 2. The location determining unit 37 includes a reception unit for receiving beacon signals transmitted, as radio waves, from a plurality of oscillators, for example. The plurality of oscillators are arranged at a plurality of sites within the range in which the carrier 1 moves. The location determining unit 37 determines the location of the body 2 based on the locations of the plurality of oscillators and the intensities of the received radio waves of the beacon signals transmitted from the plurality of oscillators. Alternatively, the location determining unit 37 may also determine the location of the body 2 using a satellite positioning system such as the global positioning system (GPS).

Optionally, the carrier 1 may further include any other appropriate component such as a charger circuit for the storage battery as needed.

The host system 4 serves as a management device 101 for use in the carrier system 100 and manages the respective operations of the plurality of carriers A1 (the plurality of carriers 1 in this embodiment) included in the carrier system 100. In this embodiment, the host system 4 may be, for example, a server implemented as a computer system including, as its major components, a processor and a memory. In other words, a computer system, including a processor and a memory, performs the function of the host system 4 by making the processor execute a program stored in the memory. The program may be stored in advance in the memory or may also be downloaded via a telecommunications line such as the Internet or distributed after having been stored on a non-transitory storage medium such as a memory card.

The host system 4 acquires detected information from each of the plurality of carriers 1. The host system 4 processes the detected information acquired with respect to each of the plurality of carriers 1. In this embodiment, the host system 4 performs semantic segmentation using deep learning, for example, on images (namely, the RGB-D image and the thermal image) included in the detected information. Note that deep learning may or may not be used for the semantic segmentation. This allows the host system 4 to recognize, on a pixel-by-pixel basis, the condition of the object to be detected represented by the images included in the detected information. For example, the semantic segmentation allows the host system 4 to determine what each pixel of the images included in the detected information represents, e.g., recognize each pixel as a background, a human, or the carrier 1. In addition, the semantic segmentation also allows the host system 4 to detect, on a pixel-by-pixel basis, the temperature of an object (including a human) on the images included in the detected information.

The host system 4 performs, based on a result of recognition by the semantic segmentation, decision processing of determining whether or not any error has occurred in the object to be detected. For example, the host system 4 may determine, by comparing an image subjected to the semantic segmentation with a normal image during the decision processing, whether or not any error has occurred in the object to be detected. As used herein, the "normal image" refers to an image representing an arbitrary object to be detected (e.g., the carrier 1 or the burden X1). The normal image describes one or more feature quantities in a situation where the object to be detected is in normal condition. Optionally, the normal image may be generated in advance by a decision unit through machine learning, for example. This allows the host system 4 to make the decision described above by using this decision unit. Alternatively, the host system 4 may also generate a normal image by carrying out machine learning by itself and make the decision described above based on the normal image thus generated.

For example, when finding, as a result of the decision processing, a passage image subjected to the semantic segmentation including an image segment representing the burden X1, the host system 4 may decide that some error should have occurred in a portion of the object to be detected (i.e., the passage in this example). Also, when finding, as a result of the decision processing, the temperature of a portion of the image subjected to the semantic segmentation higher than that of a corresponding portion of the normal image, the host system 4 may also decide that some error should have occurred in that portion of the object to be detected. A specific exemplary decision to be made by the host system 4 will be described in detail later in "(3.2) Basic operation of carrier in carrier system." The host system 4 (management device 101) is configured to output, in accordance with the result of the decision processing, operation information about the operation of the other carrier 10 to the other carrier 10. This allows the host system 4 to manage the operation of the other carrier 10 by either maintaining or changing the operation of the other carrier 10. A specific exemplary method of management by the host system 4 will be described in detail later in "(3.3.1) First exemplary operation," "(3.3.2) Second exemplary operation," and "(3.3.3) Third exemplary operation."

Also, according to this embodiment, the host system 4 is able to communicate wirelessly with not only the plurality of carriers 1 but also an administrator terminal 5 (see FIG. 7) owned by the administrator of the carrier system 100. The administrator terminal 5 may be, for example, a mobile telecommunications device or a personal computer. On deciding, based on detected information, for example, that an error should have occurred in one or more of the plurality of carriers 1, the host system 4 notifies the administrator terminal 5 of the occurrence of the error.

(3) Operation

Now it will be described how the carrier 1 and carrier system 100 according to this embodiment operate.

(3.1) Basic Operation of Carrier

First of all, it will be described basically how the carrier 1 operates. In a steady state, the carrier 1 has the drive unit 34 controlled by the control unit 35 to travel autonomously on the traveling surface 200 by driving at least one of the wheels 23. In this case, the carrier 1 travels autonomously on the traveling surface 200 in accordance with an electronic map stored in a memory (e.g., a memory of the control unit 35). The electronic map includes data about the traveling route of the carrier 1 and the current location of the burden X1 to be carried by the carrier 1. An updated electronic map is available by making the communications unit 32 receive an electronic map updated by the host system 4. Alternatively, the carrier 1 may update the electronic map by itself in accordance with a carry instruction received at the communications unit 32 from the host system 4. In addition, the carrier 1 makes the sensing unit 36 detect a situation surrounding the body 2 and collect other sorts of information while traveling. Furthermore, when the sensing unit 36 detects any obstacle ahead of the carrier 1 traveling, the carrier 1 travels autonomously so as to circumvent the obstacle within an area not deviating from the traveling route.

Also, the carrier 1 loads, in accordance with a carry instruction, a burden X1 on itself when reaching the location of the burden X1 to be carried. Specifically, first, when the elevator plate 22 is located at a lower limit position of the movable range, the carrier 1 slips its body 2 into the gap under the burden X1. In this state, the lift-up mechanism 33 elevates the elevator plate 22 to the upper-limit position of the movable range, thus having the burden X1 lifted by the upper surface (load platform 24) of the elevator plate 22. This allows the burden X1 to be loaded onto the load platform 24 of the body 2.

(3.2) Basic Operation of Carrier in Carrier System

Next, it will be described with reference to FIG. 3 basically how the carrier 1 operates in the carrier system 100. In the following description, the basic operation of the carrier system 100 will be described with attention paid to one of the plurality of carriers 1 included in the carrier system 100. Note that the operation of the carrier 1 to be described below is actually performed by each of the plurality of carriers 1.

The carrier 1 makes the sensor 31 detect (capture an image of) surroundings of the body 2 while traveling, thus acquiring detected information (including an RGB-D image and a thermal image) at regular intervals (in Step S1). Then, the carrier 1 outputs (transmits) the detected information thus acquired to the management device 101 (e.g., the host system 4 in this example) via the communications unit 32 (in Step S2).

The management device 101 carries out semantic segmentation in accordance with the detected information thus acquired, thus performing decision processing of determining whether or not any error has occurred in the object to be detected by the carrier 1 (in Step S3). In this case, examples of the objects to be detected by the carrier 1 include a condition of another carrier 10 (including the traveling route of the other carrier 10 and the burden X1 carried by the other carrier 10), the burden X1 on the traveling surface 200, a fixture such as a shelf, and the wall. A specific example of the decision processing will be described with reference to FIGS. 4A-5B, in which the dotted areas indicate areas, of which the temperature has increased from a temperature in a normal condition.

Figure 4A:
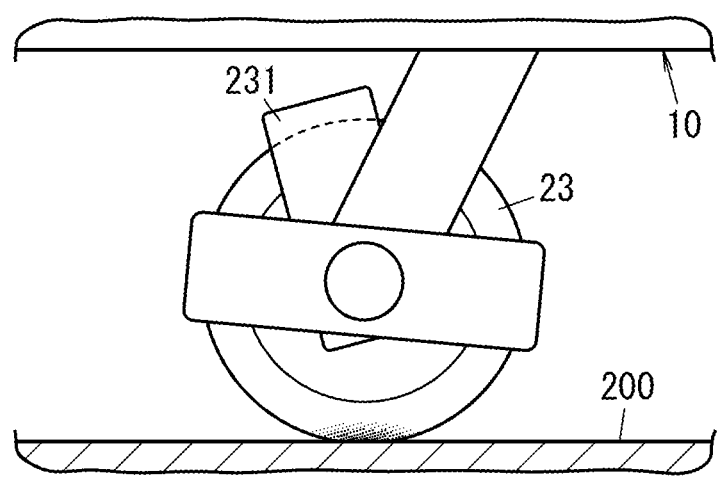
FIG. 4A schematically illustrates a normal condition of a wheel of the carrier.
Figure 4B:
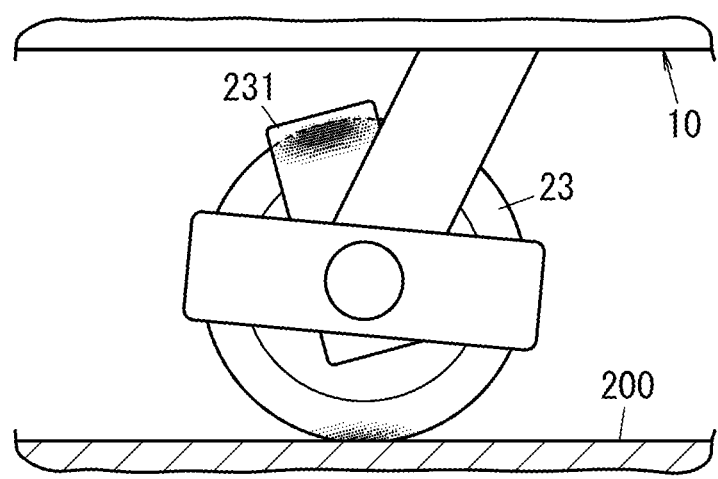
FIG. 4B schematically illustrates an abnormal condition of the wheel of the carrier.
Figure 4C:
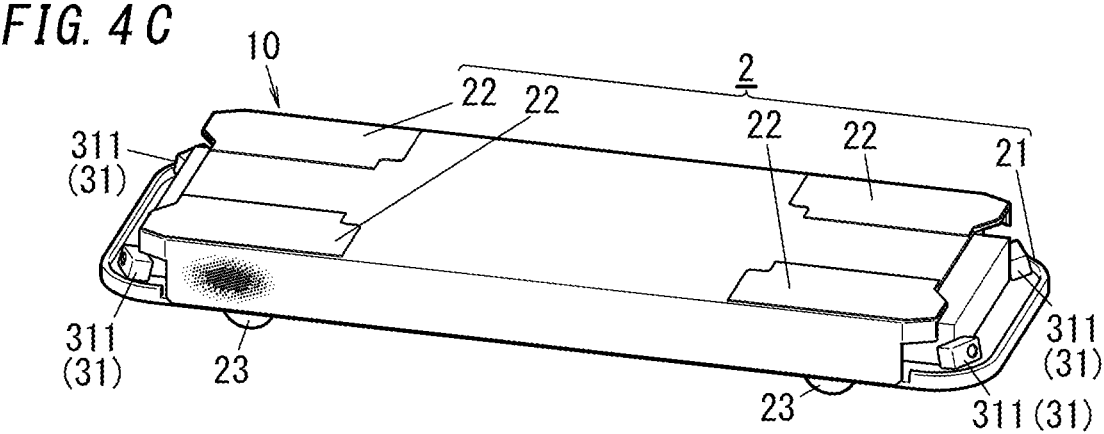
FIG. 4C schematically illustrates an abnormal condition of the body of the carrier.

If the object to be detected is the other carrier 10, the host system 4 may determine, by a combination of the semantic segmentation and the decision processing, whether or not any error has occurred in the vehicle body 21, wheels 23, sensor 31, or any other part of the other carrier 10. For example, suppose a subtle variation in the temperature of the tire of one of the wheels 23 of the other carrier 10 due to repetitive elastic deformation is a normal one. In that case, on finding that the temperature of the tire has locally increased, while the other carrier 10 is traveling, from a normal temperature thereof as shown in FIG. 4A, the host system 4 decides that some error should have occurred in the wheel 23 probably due to partial deformation or chipping of the wheel 23. Also, on finding that the temperature of a stopper 231 of the wheel 23 has increased, while the other carrier 10 is traveling, from a normal temperature thereof as shown in FIG. 4B, the host system 4 decides that some error should have occurred in the wheel 23 probably due to traveling with the wheel 23 locked by the stopper 231. Furthermore, if the temperature of the other carrier 10 has increased locally from a normal temperature thereof as shown in FIG. 4C, then the motor of the other carrier 10 may have generated heat due to overload or stress may have been concentrated due to deterioration of a portion of the vehicle body 21. In that case, the host system 4 also decides that some error should have occurred in the vehicle body 21.

If the object to be detected is the burden X1, then the host system 4 may determine, by a combination of the semantic segmentation and the decision processing, whether or not any error has occurred in the pallet X11 for the burden X1, the pile of packages X12, or anywhere else. For example, if the pallet X11 is a roll box pallet with a deformed frame X111 as shown in FIG. 5A, then the host system 4 decides that some error should have occurred in the frame X111 of the pallet X11. Also, on finding that the temperature of a wheel X112 of the roll box pallet has increased locally from a normal temperature thereof, the host system 4 decides that some error should have occurred in the wheel X112 as in the case of the wheel 23 of the other carrier 10. Furthermore, if a side bar X113 of the roll box pallet has been displaced from its normal position when the side bar X113 was put in place, then the host system 4 decides that some error should have occurred in the side bar X113 of the roll box pallet possibly due to failure to lock the side bar X113 securely.

Meanwhile, if the pallet X11 is a flat pallet with a locally deformed portion as shown in FIG. 5B, the host system 4 decides that some error should have occurred in a portion of the flat pallet. Alternatively, if the flat pallet has partially cracked to cause a local increase in the temperature of the flat pallet, for example, then the host system 4 decides that some error should have occurred in the cracked portion of the flat pallet. Still alternatively, if the pile of packages X12 placed on the flat pallet has been displaced from their normal position, then the host system 4 decides that some error should have occurred in the pile of packages X12 possibly due to improper piling of the packages X12.

Then, the host system 4 generates, based on a result of the decision processing, operation information and transmits the operation information thus generated to the other carrier 10 (in Step S4). On receiving the operation information, the other carrier 10 performs, in accordance with the operation information, processing of changing the current mode of operation, for example (in Step S5). For example, when deciding that some error should have occurred in one of the wheels 23 of the other carrier 10, the host system 4 transmits operation information, including a message that some error should have occurred in the other carrier 10, to the other carrier 10. In that case, the other carrier 10 stops traveling immediately on receiving the operation information. At this time, the host system 4 may transmit operation information, including an instruction that the other carrier 10 should stop traveling, to the other carrier 10.

As can be seen from the foregoing description, according to this embodiment, the carrier 1 makes its own sensor 31 detect any error at some blind spot, which cannot be inspected by the other carrier 10, and outputs the detected information, collected by the sensor 31, to the host system 4. In response, the host system 4 may transmit operation information, which has been generated based on the detected information acquired, to the other carrier 10, thereby managing the operation of the other carrier 10 based on the detected information. That is to say, the other carrier 10 is allowed to inspect the condition of some blind spot which would otherwise be uncheckable by itself (e.g., the condition of some region of the other carrier 10 itself or the condition of a spot yet to be reached by the other carrier 10) by being provided indirectly with the detected information by the carrier 1. In other words, this embodiment makes the information detected by one carrier 1 (i.e., detected information) available to other carrier 10.

In the foregoing description, an exemplary embodiment has been described with the roles played by one carrier 1 and another carrier 10 fixed. However, the former carrier 1 plays the role of "another carrier" from a point of view of the other carrier 10. Therefore, it can be said that the carrier 1 may receive, from the host system 4, the operation information based on the detected information, collected by the sensor 31 of the other carrier 10 and operate in accordance with the operation information received. That is to say, the carrier 1 further includes a communications unit (reception unit) 32 configured to receive, from the host system 4, operation information based on the detected information collected and output by the other carrier 10 managed by the host system 4 (management device 101). The carrier 1 operates in accordance with the operation information received by the communications unit 32.

(3.3) Exemplary Operations

Figure 6:
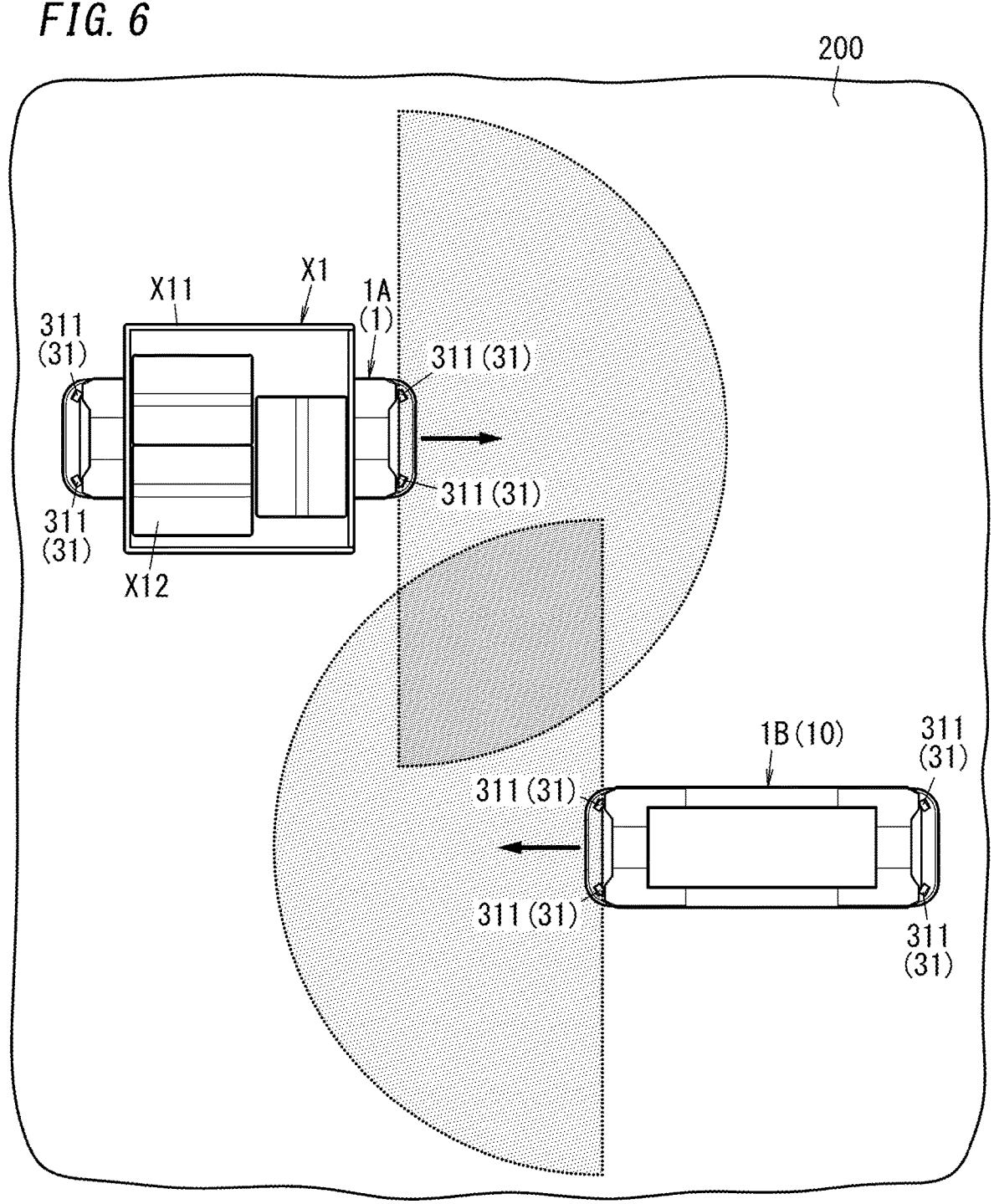
FIG. 6 schematically illustrates a situation that may arise while the carrier system is performing a first exemplary operation.
Figure 7:
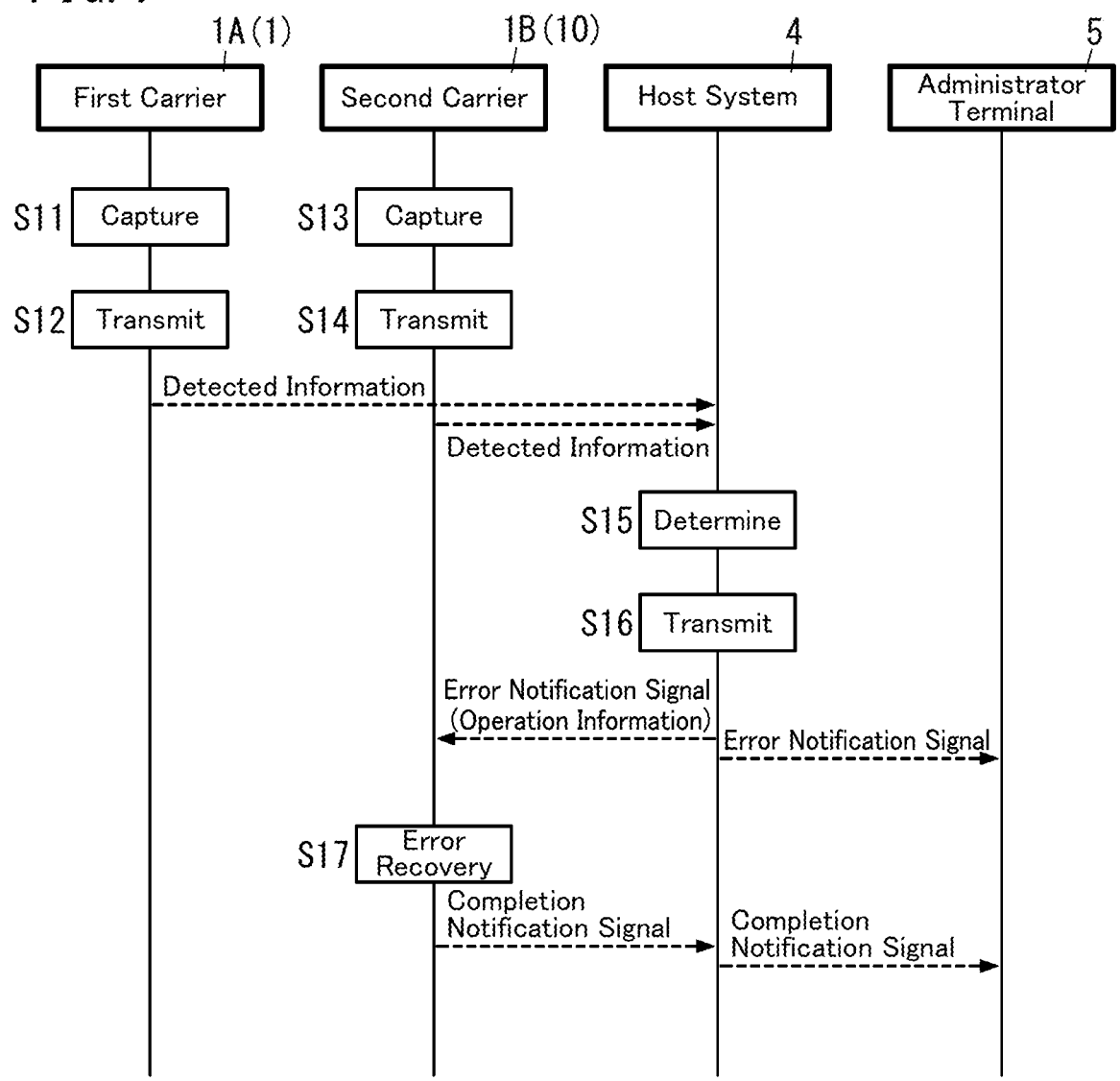
FIG. 7 is a timing chart illustrating how the carrier system performs the first exemplary operation.
Figure 8:
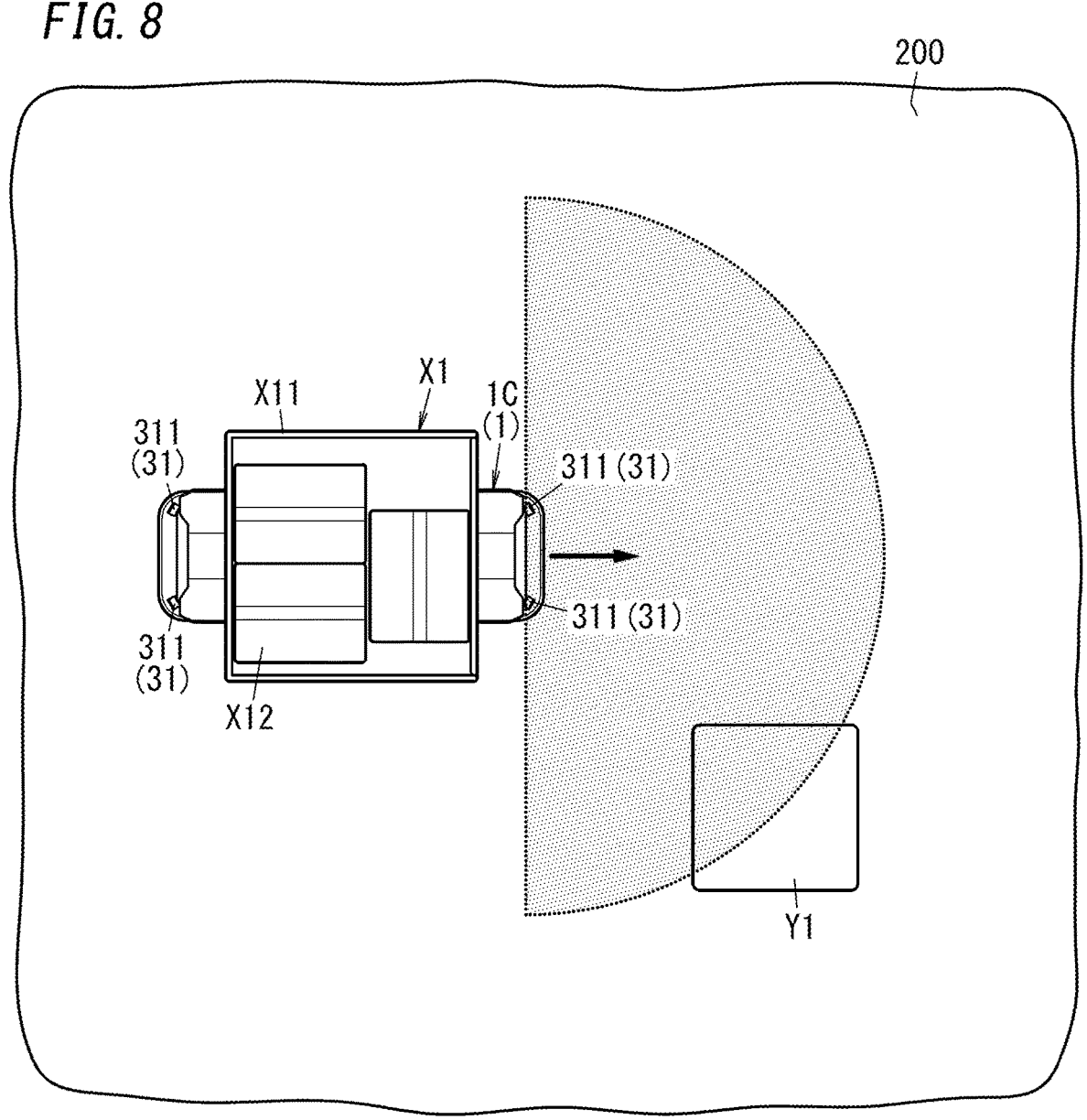
FIG. 8 schematically illustrates a situation that may arise while the carrier system is performing a second exemplary operation.
Figure 9:
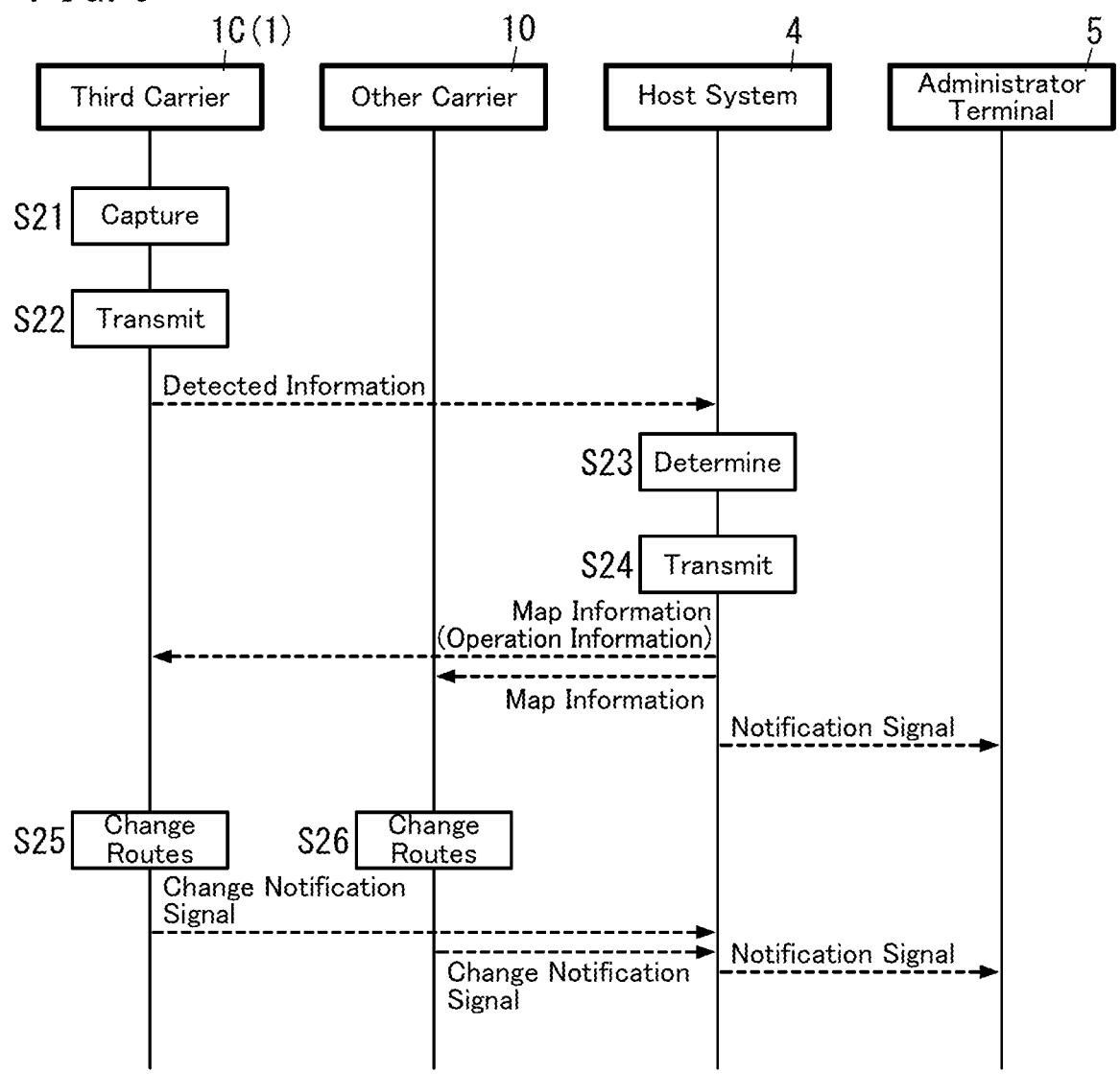
FIG. 9 is a timing chart illustrating how the carrier system performs the second exemplary operation.
Figure 10:
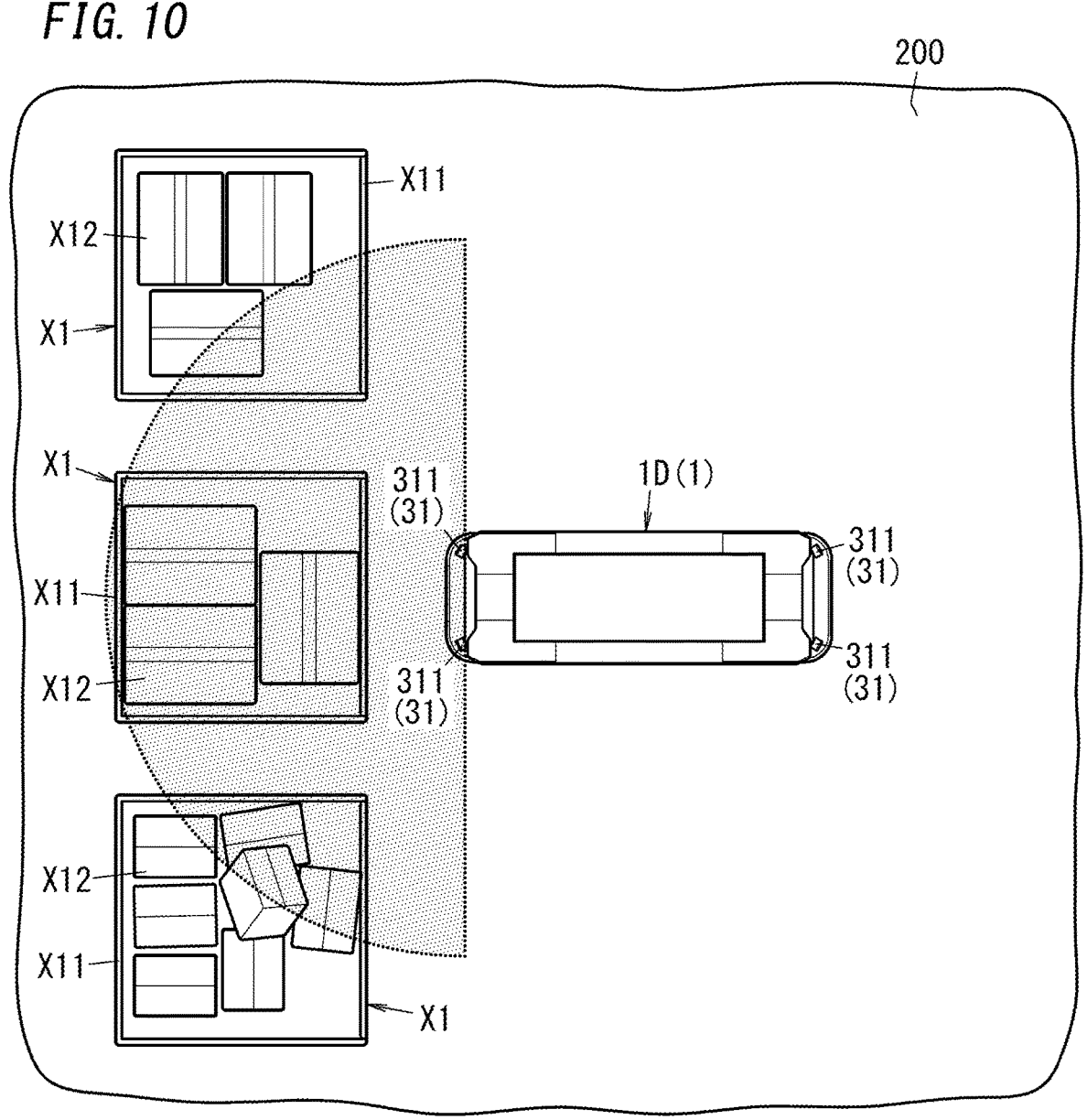
FIG. 10 schematically illustrates a situation that may arise while the carrier system is performing a third exemplary operation.

Next, first, second, and third exemplary operations of the carrier system 100 according to this embodiment will be described with reference to FIGS. 6-11. In FIGS. 6, 8, and 10, each of the dotted areas indicates the detection range of the sensor 31 (e.g., the two sensor blocks 311 provided at the front end of the body 2) of an associated one of the carrier 1 or the other carrier 10.

(3.3.1) First Exemplary Operation

First, a first exemplary operation of the carrier system 100 will be described with reference to FIGS. 6 and 7. Suppose, in this first exemplary operation, two carriers have received different carry instructions and one of the two carriers (hereinafter referred to as a "first carrier 1A") is traveling with a burden X1 loaded thereon, while the other carrier (hereinafter referred to as a "second carrier 1B") is traveling toward a different burden X1 from the burden X1 carried by the first carrier 1A. The first exemplary operation will be described with the first carrier 1A supposed to be the "carrier 1" and with the second carrier 1B supposed to be the "other carrier 10."

When these two carriers are crossing each other, each of the first and second carriers 1A and 1B has an image of the other carrier captured by its sensor 31 while traveling. Specifically, the first carrier 1A captures an image of the second carrier 1B crossing as the object to be detected (in Step S11). Then, the first carrier 1A transmits detected information collected by capturing its image from the communications unit 32 to the host system 4 (in Step S12). Meanwhile, the second carrier 1B captures an image of the first carrier 1A crossing as the object to be detected (in Step S13). Then, the second carrier 1B transmits detected information collected by capturing its image to the host system 4 via the communications unit 32 (in Step S14).

The host system 4 determines, in accordance with the detected information received from the first carrier 1A, the condition of the second carrier 1B that is the object to be detected by the first carrier 1A (in Step S15). Likewise, the host system 4 also determines, in accordance with the detected information received from the second carrier 1B, the condition of the first carrier 1A that is the object to be detected by the second carrier 1B (in Step S15). Specifically, the host system 4 carries out, based on images (namely, an RGB-D image and a thermal image) included in the detected information received from the first carrier 1A, semantic segmentation. Then, the host system 4 performs decision processing of determining, based on the result of the semantic segmentation, whether or not any error has occurred in the second carrier 1B. In the same way, the host system 4 carries out, based on images included in the detected information received from the second carrier 1B, semantic segmentation and decision processing to determine whether or not any error has occurred in the first carrier 1A. In the example illustrated in FIG. 7, the host system 4 decides that some error should have occurred in the second carrier 1B. Thus, the host system 4 transmits an error notification signal, indicating that some error should have occurred in the second carrier 1B, to the second carrier 1B and the administrator terminal 5 (in Step S16). The error notification signal suitably contains information specifying a spot where the error has occurred. The error notification signal suitably further contains information about the cause of the error.

On receiving the error notification signal, the second carrier 1B stops traveling and notifies a worker of the occurrence of an error by sounding an alarm, for example. That is to say, the second carrier 1B takes appropriate action against the error that has occurred on receiving the error notification signal as a piece of operation information (in Step S17). This allows the worker, who has caught the alarm sound, to remove the error from the second carrier 1B by performing appropriate recovery jobs (such as replacing the wheel 23 and straightening up the pile of packages X12) on the second carrier 1B. On removing the error from the second carrier 1B, the worker turns a switch provided for the second carrier 1B. This allows the second carrier 1B to transmit a completion notification signal, indicating that the error has been removed successfully, to the host system 4 via the communications unit 32. On receiving the completion notification signal, the host system 4 notifies the administrator that the error has been removed successfully from the second carrier 1B by relaying the completion notification signal received to the administrator terminal 5, for example.

Alternatively, if the second carrier 1B has no mechanism to sound an alarm or if there are no workers on a spot where the second carrier 1B is currently located, then the administrator himself may head to the spot or may instruct that a worker should be dispatched to the spot. Even so, the recovery work may also be done on the second carrier 1B by either the administrator or the worker dispatched. In addition, even in such a situation, the worker dispatched may also notify, by turning a switch provided for the second carrier 1B, the host system 4 and the administrator terminal 5 that the error has been removed from the second carrier 1B.

As can be seen from the foregoing description, in the first exemplary operation, the carrier 1 makes the sensor 31 detect the condition of the other carrier 10 as the object to be detected while crossing the other carrier 10, and outputs detected information to the host system 4. In response, the host system 4 transmits an error detection signal (operation information) based on the detected information acquired to the other carrier 10, thus managing the operation of the other carrier 10. That is to say, this first exemplary operation makes information about the condition, detected by the carrier 1, of the other carrier 10 (e.g., whether or not any error has occurred in the other carrier 10) available to the other carrier 10.

(3.3.2) Second Exemplary Operation

Next, a second exemplary operation of the carrier system 100 will be described with reference to FIGS. 8 and 9. Suppose, in this second exemplary operation, a single carrier (hereinafter referred to as a "third carrier 1C") has received a carry instruction and the third carrier 1C is traveling with a burden X1 loaded thereon. Also, the second exemplary operation will be described with the third carrier 1C supposed to be the "carrier 1."

In this example, if any obstacle Y1 such as a load not to be carried in accordance with a carry instruction is present on the traveling route of the third carrier 1C or if there is any impediment around the traveling route, then the third carrier 1C makes the sensor 31 capture an image of the obstacle Y1 or the impediment as the object to be detected (in Step S21). In this case, if there is any obstacle Y1, the third carrier 1C makes the sensor 31 capture an image of the obstacle Y1 while at a stop. On the other hand, if there are no obstacles Y1, the third carrier 1C makes the sensor 31 capture an image while either at a stop or traveling. Then, the third carrier 1C transmits detected information collected by image capturing to the host system 4 via the communications unit 32 (in Step S22).

The host system 4 performs, based on the detected information received from the third carrier 1C, semantic segmentation and decision processing to determine whether or not any error has occurred on or around the traveling route of the third carrier 1C (in Step S23). In the example illustrated in FIG. 9, the host system 4 decides that there should be some obstacle Y1 on or around the traveling route of the third carrier 1C. Thus, the host system 4 updates an electronic map by designating, on the electronic map, a spot where the error has occurred (i.e., the location of the obstacle Y1). Then, the host system 4 transmits map information, including data about the updated electronic map, as operation information to all of the carriers 1 (in Step S24). That is to say, the operation information includes at least a piece of information about the traveling route of the other carrier. Optionally, the host system 4 may transmit the map information to only the third carrier 1C and the carrier 1 with the traveling route yet to be updated, on which the spot where the error has occurred is present. In addition, the host system 4 transmits a notification signal, containing information designating the spot where the error has occurred, to the administrator terminal 5.

The third carrier 1C updates, with the data of the electronic map included in the map information received, the electronic map stored in the memory. This creates a new traveling route that allows the third carrier 1C to circumvent the obstacle Y1. Thus, the third carrier 1C resumes traveling along the new traveling route. In addition, the third carrier 1C transmits a change notification signal, indicating that a new traveling route has been created, to the host system 4 via the communications unit 32.

In the same way, another carrier 1 other than the third carrier 1C (i.e., the other carrier 10) also updates, with the data of the electronic map included in the map information received, the electronic map stored in the memory. This creates a new traveling route that allows the other carrier 10, having the obstacle Y1 on the current traveling route, to circumvent the obstacle Y1. Then, the other carrier 10 starts traveling along the new traveling route. In addition, the other carrier 10 also transmits a change notification signal, indicating that a new traveling route has been created, to the host system 4 via the communications unit 32. On the other hand, the other carrier 10, having no obstacles Y1 on the current traveling route, continues to travel along the current traveling route. This other carrier 10 does not transmit any change notification signal to the host system 4.

On receiving the change notification signal from the third carrier 1C and the other carrier 10, the host system 4 notifies the administrator that new traveling routes have been created for the third carrier 1C and the other carrier 10 by relaying the change notification signal received to the administrator terminal 5, for example. The change notification signal suitably contains information indicating the new traveling routes created.

In another application, on finding that the temperature of the object to be detected (which may be the obstacle Y1 on the traveling route or any other impediment off the route) by the third carrier 1C has increased excessively from its normal temperature, the host system 4 decides that a fire (including a small fire) should have broken out in the obstacle Y1 or the impediment. In that case, the host system 4 notifies the administrator terminal 5 of the outbreak of the fire. This allows the administrator to take appropriate action such as dispatching a worker to the spot to extinguish the fire.

As can be seen from the foregoing description, according to this second exemplary operation, the carrier's 1 outputting the detected information to the host system 4 allows the host system 4 to update the electronic map as needed in accordance with the detected information received. This allows the updated electronic map to be shared by not only the carrier 1 that has output the detected information but also the other carrier 10 as well. That is to say, according to this second exemplary operation, the host system 4 transmits the updated electronic map to the carrier 1 and the other carrier 10 to manage the operations of the carrier 1 and the other carrier 10 indirectly. In addition, this second exemplary operation also makes information, detected by the carrier 1, about the condition of the other carrier 10 (e.g., the conditions of the traveling route of at least one of the carrier 1 or the other carrier 10) available to the other carrier 10.

(3.3.3) Third Exemplary Operation

Next, a third exemplary operation of the carrier system 100 will be described with reference to FIGS. 10 and 11. Suppose, in this third exemplary operation, a single carrier 1 (hereinafter referred to as a "fourth carrier 1D") has received a carry instruction and a burden X1, which is the object to be carried by the fourth carrier 1D in accordance with the carry instruction, is located in front of the fourth carrier 1D. Also suppose there are two other burdens X1 (each including the pallet X11 and the pile of packages X12 placed on the pallet X11) on both sides of the burden X1. Further, the third exemplary operation will be described with the fourth carrier 1D supposed to be the "carrier 1."

The fourth carrier 1D makes the sensor 31 capture respective images of the burden X1 to be carried in accordance with the carry instruction and two other burdens X1 located on both sides of the burden X1 as three objects to be detected (in Step S31). Then, the fourth carrier 1D transmits detected information collected by image capturing to the host system 4 via the communications unit 32 (in Step S32). In addition, the fourth carrier 1D has the burden X1 to be carried in accordance with the carry instruction loaded onto the body 2 by the lift-up mechanism 33 and starts carrying the burden X1 (in Step S33). The detected information may be transmitted either before or after the burden X1 starts to be carried.

The host system 4 performs, in accordance with the detected information received from the fourth carrier 1D, semantic segmentation and decision processing to determine the respective conditions of the two other burdens X1 that are objects to be detected by the fourth carrier 1D (in Step S34). In the example illustrated in FIG. 11, the host system 4 decides that the pile of packages X12 of one of the two other burdens X1 (e.g., the lower burden X1 shown in FIG. 10) should have collapsed. Thus, the host system 4 transmits instruction information, including an instruction that the burden X1 with the collapsed pile of packages X12 should be removed from the list of objects to be carried, to the other carrier 10 that is supposed to carry that burden X1 with the collapsed pile of packages X12 (in Step S35). In addition, the host system 4 also transmits a notification signal, containing information to identify the burden X1 with the collapsed pile of packages, to the administrator terminal 5. This allows the administrator to take appropriate action such as dispatching a worker to the spot and making him or her straighten up the pile of packages X12 of the burden X1.

The other carrier 10 removes, in accordance with the instruction information received, the burden X1 with the collapsed pile of packages from the list of objects to be carried (in Step S36). In this processing step, the other carrier 10 suitably keeps the burden X1 with the collapsed pile of packages removed from the list of objects to be carried until the other carrier 10 receives a notification signal, indicating that the burden X1 has been straightened up, from the host system 4.

As can be seen from the foregoing description, according to the third exemplary operation, when starting to carry the burden X1 in accordance with the carry instruction, the carrier 1 makes the sensor 31 detect the condition of the other burden X1 as the object to be detected, and outputs detected information to the host system 4. In response, the host system 4 transmits instruction information (operation information), based on the detected information thus acquired, to the other carrier 10, thus managing the operation of the other carrier 10. That is to say, the third exemplary operation makes information, detected by the carrier 1, about the condition of the burden X1 to be carried by the other carrier 10 available to the other carrier 10.

(4) Variations

The embodiment described above is only one of various embodiments of the present disclosure, and may be readily modified, changed, replaced, or combined with any other embodiments, depending on a design choice or any other factor, without departing from a true spirit and scope of the present disclosure. Also, the same function as that of the control unit 35 of the carrier 1 may be implemented as a method for controlling the carrier 1, a computer program of controlling the carrier 1, or a non-transitory storage medium that stores the computer program thereon.

A method for controlling a carrier 1 according to an aspect is a method for controlling a carrier 1 including a body 2 and a sensor 31. The body 2 has the ability to travel autonomously and includes a holding mechanism (e.g., a lift-up mechanism 33 in this example) for holding a burden X1. The sensor 31 is provided for the body 2 and detects a situation surrounding the body 2. The method for controlling a carrier 1 includes outputting detected information, collected by the sensor 31, to a management device 101 (e.g., the host system 4 in this example) for managing operation of another carrier 10.

A non-transitory storage medium according to another aspect has stored thereon a program for controlling a carrier 1 including a body 2 and a sensor 31. The body 2 has the ability to travel autonomously and includes a holding mechanism (e.g., a lift-up mechanism 33 in this example) for holding a burden X1. The sensor 31 is provided for the body 2 and detects a situation surrounding the body 2. The program is designed to make a computer system execute output processing of outputting detected information, collected by the sensor 31, to a management device 101 (e.g., the host system 4 in this example) that manages operation of another carrier 10.

Next, variations of the embodiment described above will be enumerated one after another. Optionally, any of the variations to be described below may be adopted in combination as appropriate.

In the carrier 1 according to the present disclosure, the control unit 35, the sensing unit 36, and other components may include a computer system. In that case, the computer system may include, as principal hardware components, a processor and a memory. The functions of the control unit 35, the sensing unit 36 and other components according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). As used herein, the "integrated circuit" such as an IC or an LSI is called by a different name depending on the degree of integration thereof. Examples of the integrated circuits include a system LSI, a very largescale integrated circuit (VLSI), and an ultra largescale integrated circuit (VLSI). Optionally, a field-programmable gate array (FPGA) to be programmed after an LSI has been fabricated or a logic device allowing the connections or circuit sections inside of an LSI to be reconstructed may also be adopted as the processor. Those electronic circuits may be either integrated together on a single chip or distributed on multiple chips without limitation. Those multiple chips may be integrated together in a single device or distributed in multiple devices without limitation. As used herein, the "computer system" may also be a microcontroller including at least one processor and at least one memory. Thus, the microcontroller may also be made up of a single or a plurality of electronic circuits including a semiconductor integrated circuit (IC) or a largescale integrated circuit (LSI).

In the first exemplary operation of the carrier system 100 described above, the host system 4 may transmit operation information to change the behavior of the other carrier 10 according to the condition of the burden X1 to be carried by the other carrier 10 to the other carrier 10. Suppose, for example, the burden X1 to be carried by the other carrier 10 is a flat pallet and the pile of packages X12 placed on the flat pallet has collapsed to some extent. In that case, the host system 4 may transmit operation information, including an instruction that the turning speed should be lower than normal or that a turn to the right is prohibited, to the other carrier 10.

In the first exemplary operation of the carrier system 100 described above, a plurality of (e.g., two in this example) carriers 1A, 1B that are traveling in opposite directions cross each other. However, this is only an example and should not be construed as limiting. For example, even when a plurality of carriers 1A, 1B traveling in the same direction cross each other in the first exemplary operation, one carrier 1A (or 1B) is still able to make its sensor 31 detect the other carrier 1B (or 1A).

In the second exemplary operation of the carrier system 100 described above, the host system 4 transmits map information, including data of an electronic map that has been updated based on the detected information, as operation information to the third carrier 1C and the other carrier 10. However, this is only an example and should not be construed as limiting. Alternatively, the host system 4 may also transmit either an instruction that the obstacle Y1 should be removed from the current traveling route or an instruction to travel while circumventing the obstacle Y1 as operation information to the third carrier 1C and the other carrier 10.

In the embodiments described above, the sensor 31 is kept ON while the carrier 1 is traveling. However, this is only an example and should not be construed as limiting. Alternatively, the sensor 31 may also be turned ON when the sensing unit 36 detects any object in the surroundings. In that case, the sensor 31 may be turned OFF at a point in time when the sensing unit 36 no longer detects any object or when a predetermined amount of time passes since the point in time of detection.

Also, in the embodiments described above, the sensor 31 acquires depth information by making the RGB camera capture a series of images while the carrier 1 is traveling. However, this is only an example and should not be construed as limiting. Alternatively, the sensor 31 may also use a stereoscopic camera to acquire depth information based on a parallax between two cameras included in the stereoscopic camera. Still alternatively, the sensor 31 may also use a time of flight (ToF) camera to acquire depth information based on the amount of time it takes for a laser beam projected to reach, and come back from, the object.

Furthermore, in the embodiments described above, the sensor 31 includes both an RGB camera and an infrared camera. However, this is only an example and should not be construed as limiting. Alternatively, the sensor 31 may use only one of the RGB camera or the infrared camera. The sensor 31 may also be a temperature sensor, a rangefinder sensor, or an acoustic sensor (microphone), for example. Optionally, the sensor 31 may include at least one device selected from the group consisting of these sensors, the RGB camera, and the infrared camera.

Furthermore, in the embodiments described above, the plurality of carriers 1 are managed by the host system 4. However, this is only an example and should not be construed as limiting. Alternatively, the plurality of carriers 1 may be configured to communicate with each other directly without the intermediation of the host system 4. In that case, no host systems 4 are needed. Furthermore, according to this configuration, the carrier 1 that is the principal that performs each of the first, second, and third exemplary operations may play the role of the host system 4. That is to say, all carriers 1 included in the carrier system 100 may perform the function of the host system 4. Naturally, the carrier system 100 may also be configured such that at least one carrier 1, not all carriers 1, replaces the host system 4. In other words, the carrier system 100 may or may not include the host system 4. If the carrier system 100 includes no host systems 4, then at least one of the plurality of carriers 1 may serve as the management device 101.

In the embodiments described above, each of the plurality of carriers A1 included in the carrier system 100 serves as the carrier 1 and includes a communications unit 32 with capabilities of both an output unit and a reception unit. However, this is only an example and should not be construed as limiting. Alternatively, at least one of the plurality of carriers A1 may be a carrier A1 with a reception unit but without an output unit. In addition, at least one of the plurality of carriers A1 may be a carrier A1 with an output unit but without a reception unit. That is to say, the carrier system 100 may include a carrier A1 with an output unit and no reception units and a carrier A1 with a reception unit and no output units.

Furthermore, in the embodiments described above, the holding mechanism for the carrier 1 is a lift-up mechanism 33. However, this is only an example and should not be construed as limiting. For example, if the pallet X11 is a flat pallet, the carrier 1 suitably includes, as the holding mechanism 33, some mechanism for holding the flat pallet, such as a fork insertable into an insertion port for the flat pallet or an elevator mechanism for elevating and lowering the fork.

Furthermore, in the embodiments described above, each of the plurality of carriers A1 included in the carrier system 100 is a lift carrier designed to carry a pallet X11, for example, by elevating and lowering the pallet X11. However, this is only an example and should not be construed as limiting. Alternatively, the carrier A1 may also be a tractor carrier designed to carry a pallet X11 such as a roll box pallet by towing the pallet X11 with a hook, for example. In that case, a mechanism, such as the hook, for towing the pallet X11 corresponds to the holding mechanism 33. Still alternatively, the plurality of carriers A1 may also include both a lift carrier and a tractor carrier.

(4) Resume

As can be seen from the foregoing description, a carrier (1) according to a first aspect includes a body (2), a sensor (31), and an output unit (communications unit (32)). The body (2) has the ability to travel autonomously and includes a holding mechanism (lift-up mechanism (33) for holding a burden (X1). The sensor (31) is provided for the body (2) and detects a situation surrounding the body (2). The output unit outputs detected information, collected by the sensor (31), about the situation to a management device (101) that manages operation of another carrier (10).

This aspect makes information detected (i.e., detected information) available to another carrier (10).

In a carrier (1) according to a second aspect, which may be implemented in conjunction with the first aspect, the situation to be detected by the sensor (31) includes a condition of the other carrier (10).

This aspect allows the management device (101) to manage the operation of another carrier (10) in accordance with a condition, which cannot be inspected by itself, of the other carrier (10).

In a carrier (1) according to a third aspect, which may be implemented in conjunction with the second aspect, the condition of the other carrier (10) includes whether or not any error has occurred in the other carrier (10).

This aspect allows the management device (101) to manage the operation of another carrier (10) by determining whether or not any error has occurred in any blind spot, which cannot be inspected by itself, of the other carrier (10).

In a carrier (1) according to a fourth aspect, which may be implemented in conjunction with the second or third aspect, the condition of the other carrier (10) includes a condition of a burden (X1) carried by the other carrier (10).

This aspect allows the management device (101) to manage the operation of another carrier (10) in accordance with a condition, which cannot be inspected by itself, of a burden (X1) carried by the other carrier (10).

In a carrier (1) according to a fifth aspect, which may be implemented in conjunction with any one of the first to fourth aspects, the situation to be detected by the sensor (31) includes conditions of a traveling route of the carrier (1) and/or the other carrier (10).

This aspect allows the management device (101) to manage the operation of another carrier (10) in accordance with conditions at a spot yet to be reached by the other carrier (10).

In a carrier (1) according to a sixth aspect, which may be implemented in conjunction with any one of the first to fifth aspects, the sensor (31) includes a camera configured to capture an image of surroundings of the body (2).

In a carrier (1) according to a seventh aspect, which may be implemented in conjunction with the sixth aspect, the sensor (31) includes an RGB camera and/or an infrared camera.

In a carrier (1) according to an eighth aspect, which may be implemented in conjunction with the seventh aspect, the management device (101) is configured to output operation information, including information about operation of the other carrier (10), to the other carrier (10). The operation information includes at least information about a traveling route of the other carrier (10).

This aspect allows the other carrier (10) to change its traveling route in accordance with conditions at a spot yet to be reached by the other carrier (10).

A carrier (1) according to a ninth aspect, which may be implemented in conjunction with any one of the first to eighth aspects, further includes a reception unit (communications unit (32)) configured to receive, from the management device (101), operation information based on detected information collected about the situation and output by the other carrier (10) managed by the management device (101). The carrier (1) operates in accordance with the operation information received by the reception unit.

This aspect allows one carrier (1) to use the detected information, namely, information detected by another carrier (10) operating as the carrier (1).

A carrier (11) with reception capability according to a tenth aspect includes a body (2) and a reception unit (communications unit (32)). The body (2) has the ability to travel autonomously and includes a holding mechanism (lift-up mechanism (33)) configured to hold a burden (X1). The reception unit receives, from the management device (101), operation information based on the detected information output by the carrier (1) according to any one of the first to seventh aspects. The carrier (11) with reception capability operates in accordance with the operation information received by the reception unit.

This aspect makes information detected by one carrier (1) (i.e., detected information) available to the carrier (11) with reception capability, which is another carrier (10).

A carrier system (100) according to an eleventh aspect includes a plurality of carriers (A1). The plurality of carriers (A1) includes the carrier (1) according to any one of the first to ninth aspects and a carrier (11) with reception capability. The carrier (11) with reception capability includes a body (2) and a reception unit (communications unit (32)). The body (2) has the ability to travel autonomously and includes a holding mechanism (lift-up mechanism (33)) configured to hold a burden (X1). The reception unit receives, from the management device (101), operation information based on the detected information output by the carrier (1). The carrier (11) with reception capability operates in accordance with the operation information received by the reception unit.

This aspect makes information detected by one carrier (1) (i.e., detected information) available to the carrier (11) with reception capability, which is another carrier (10).

A host system (4) according to a twelfth aspect functions as the management device (101) for use in the carrier system (100) according to the eleventh aspect. The host system (4) manages respective operations of the plurality of carriers (A1).

This aspect makes information detected by one carrier (1) (i.e., detected information) available to another carrier (10).

A method for controlling a carrier (1) according to a thirteenth aspect is a method for controlling a carrier (1) including a body (2) and a sensor (31). The body (2) has the ability to travel autonomously and includes a holding mechanism (lift-up mechanism (33)) for holding a burden (X1). The sensor (31) is provided for the body (2) and detects a situation surrounding the body (2). The method for controlling a carrier (1) includes outputting detected information, collected by the sensor (31), about the situation to a management device (101) that manages operation of another carrier (10).

This aspect makes information detected by one carrier (1) (i.e., detected information) available to another carrier (10).

A non-transitory storage medium according to a fourteenth aspect has stored thereon a program for controlling a carrier (1) including a body (2) and a sensor (31). The body (2) has the ability to travel autonomously and includes a holding mechanism (lift-up mechanism (33)) for holding a burden (X1). The sensor (31) is provided for the body (2) and detects a situation surrounding the body (2). The program is designed to make a computer system execute output processing of outputting detected information, collected by the sensor (31), about the situation to a management device (101) that manages operation of another carrier (10).

This aspect makes information detected by one carrier (1) (i.e., detected information) available to another carrier (10).

Note that the configurations according to the second to ninth aspects are not essential constituent elements of the carrier (1) but may be omitted as appropriate.

The invention claimed is:

1. A carrier as a first carrier, the carrier comprising:
   a body having the ability to travel autonomously and including a holding mechanism configured to hold a burden;
   a sensor provided for the body and configured to capture an image of a second carrier around the body; and
   an output unit configured to transmit the captured image to a management device configured to manage an operation of the second carrier which is different from the first carrier,
   wherein the management device is further configured to determine whether or not any abnormal condition of at least one of the body, wheels, and the burden has occurred at the second carrier based on the captured image, and to transmit, to an administrator's terminal, a notification signal indicating that an error has occurred at the second carrier with a location of the error,
   wherein the abnormal condition of the second carrier includes a deformed condition of a frame carried by the second carrier, the frame containing packages therein.

2. The carrier of claim 1, wherein
   the sensor is further configured to detect conditions of a traveling route of the first carrier and/or the second carrier.

3. The carrier of claim 1, wherein
   the sensor includes a camera configured to capture an image of surroundings of the body.

4. The carrier of claim 3, wherein
   the sensor includes an RGB camera and/or an infrared camera.

5. The carrier of claim 2, wherein
   the management device is configured to output operation information, including information about operation of the second carrier, to the second carrier, and
   the operation information includes at least information about a traveling route of the second carrier.

6. The carrier of claim 1, further comprising a reception unit configured to receive, from the management device, operation information based on the determined abnormal condition and output by the second carrier managed by the management device, wherein
   the carrier operates in accordance with the operation information received by the reception unit.

7. The carrier of claim 1, wherein
   a situation to be detected by the sensor includes conditions of a traveling route of the first carrier and/or the second carrier.

8. The carrier of claim 1, further comprising
   another sensor is configured to measure a respective temperature of each of the wheels of the second carrier, wherein
   the abnormal condition of the second carrier is determined by the another sensor when one of the wheels has a temperature higher than a threshold temperature.

9. The carrier of claim 1, wherein
   the sensor measures a volume of a sound occurred from each of wheel tires of the carrier, and
   the abnormal condition of the second carrier is determined by the sensor when one of the wheel tires has a volume of a sound higher than a threshold volume.

10. The carrier of claim 1, wherein when a pile of packages placed on a pallet that the second carrier is carrying is displaced from a normal position, the management device determines that the abnormal condition has occurred at the second carrier.

11. The carrier of claim 1, wherein the sensor is configured to capture images of a body, wheels, and a burden of the second carrier around the body.

12. A carrier with a reception capability as a first carrier, the carrier comprising:
    a body having the ability to travel autonomously and including a holding mechanism configured to hold a burden;
    a sensor provided for the body and configured to capture an image of a second carrier around the body;
    an output unit configured to transmit the captured image to a management device configured to manage an operation of the second carrier which is different from the first carrier
    a reception unit configured to receive, from a management device, operation information based on a detected situation detected by a sensor of a second carrier and output by the second carrier which is different from the first carrier,
    the carrier with a reception capability operating in accordance with the operation information received by the reception unit,
    wherein the management device is further configured to determine whether or not any abnormal condition of at least one of the body, a wheel, and the burden has occurred at the second carrier based on the captured image,
    and to transmit, to an administrator's terminal, a notification signal indicating that an error has occurred at the second carrier with a location of the error,
    wherein the abnormal condition of the second carrier includes a deformed condition of a frame carried by the second carrier, the frame containing packages therein.

13. The carrier of claim 12, wherein when a pile of packages placed on a pallet that the second carrier is carrying is displaced from a normal position, the management device determines that the abnormal condition has occurred at the second carrier.

14. The carrier of claim 12, wherein the sensor is configured to capture images of a body, wheels, and a burden of the second carrier around the body.

15. A carrier system comprising a plurality of carriers, the plurality of carriers including:
   a first carrier; and
   a second carrier,
   the first carrier including:
      a body having the ability to travel autonomously and including a holding mechanism configured to hold a burden;
      a sensor provided for the body and configured to capture an image of a second carrier around the body; and
      an output unit configured to transmit the captured image to a management device configured to manage an operation of the second carrier which is different from the first carrier,
   wherein the management device is further configured to determine whether or not any abnormal condition of at least one of the body, a wheel, and the burden has occurred at the second carrier based on the captured image, and
      to transmit, to an administrator's terminal, a notification signal indicating that an error has occurred at the second carrier with a location of the error,
   the second carrier including:
      a body having the ability to travel autonomously and including a holding mechanism configured to hold a burden; and
      a reception unit configured to receive, from the management device, operation information based on the determined abnormal condition,
   the second carrier operating in accordance with the operation information received by the reception unit,
   wherein the abnormal condition of the second carrier includes a deformed condition of a frame carried by the second carrier, the frame containing packages therein.

16. The carrier system of claim 15, wherein the sensor is configured to capture images of a body, wheels, and a burden of the second carrier around the body.

17. A host system managing respective operations of a plurality of carriers,
   the plurality of carriers including:
      a first carrier; and
      a second carrier,
   the first carrier including:
      a body having the ability to travel autonomously and including a holding mechanism configured to hold a burden;
      a sensor provided for the body and configured to detect a situation surrounding the body; and
      an output unit configured to transmit the captured image to a management device configured to manage an operation of the second carrier which is different from the first carrier,
   wherein the management device is further configured to determine whether or not any abnormal condition of at least one of the body, a wheel, and the burden has occurred at the second carrier based on the captured image, and
      to transmit, to an administrator's terminal, a notification signal indicating that an error has occurred at the second carrier with a location of the error,
   the second carrier including:
      a body having the ability to travel autonomously and including a holding mechanism configured to hold a burden; and
      a reception unit configured to receive, from the management device, operation information based on the determined abnormal condition,
   wherein the second carrier operates in accordance with the operation information received by the reception unit,
   wherein the abnormal condition of the second carrier includes a deformed condition of a frame carried by the second carrier, the frame containing packages therein.

18. The host system of claim 17, wherein when a pile of packages placed on a pallet that the second carrier is carrying is displaced from a normal position, the management device determines that the abnormal condition has occurred at the second carrier.

19. The host system of claim 17, wherein the sensor is configured to detect the situation surrounding the body by capturing images of a body, wheels, and a burden of a second carrier.

20. A method for controlling a carrier as a first carrier, the carrier comprising:
   a body having the ability to travel autonomously and including a holding mechanism configured to hold a burden; and
   a sensor provided for the body and configured to capture an image of a second carrier around the body,
   the method comprising:
      transmitting the captured image to a management device configured to manage an operation of the second carrier which is different from the first carrier; and
      determining whether or not any abnormal condition of at least one of the body, a wheel, and the burden has occurred in the second carrier based on the captured image,
   wherein the management device transmits, to an administrator's terminal, a notification signal indicating that an error has occurred at the second carrier with a location of the error,
   wherein the abnormal condition of the second carrier includes a deformed condition of a frame carried by the second carrier, the frame containing packages therein.

21. The method of claim 20, wherein when a pile of packages placed on a pallet that the second carrier is carrying is displaced from a normal position, the management device determines that the abnormal condition has occurred at the second carrier.

22. The method of claim 20, wherein the method further comprises capturing images of a body, wheels, and a burden of the second carrier around the body.

23. A non-transitory storage medium having stored thereon a program for controlling a carrier as a first carrier, the carrier comprising:
   a body having the ability to travel autonomously and including a holding mechanism configured to hold a burden; and
   a sensor provided for the body and configured to capture an image of a second carrier around the body,
   the program being designed to make a computer system execute a method comprising transmitting the captured image to a management device configured to manage an operation of the second carrier which is different from the first carrier; and determining whether or not any abnormal condition of at least one of the body, a wheel, and the burden has occurred in the second carrier based on the captured image, wherein the management device transmits, to an administrator's terminal, a notification signal indicating that an error has occurred at the second carrier with a location of the error, wherein the abnormal condition of the second carrier includes a deformed condition of a frame carried by the second carrier, the frame containing packages therein.

24. The non-transitory storage medium of claim 23, wherein when a pile of packages placed on a pallet that the second carrier is carrying is displaced from a normal position, the management device determines that the abnormal condition has occurred at the second carrier.

25. The non-transitory storage medium of claim 23, wherein the method further comprises capturing images of a body, wheels, and a burden of the second carrier around the body.

* * * * *